US012455608B2

(12) United States Patent
Yu et al.

(10) Patent No.: US 12,455,608 B2
(45) Date of Patent: Oct. 28, 2025

(54) PEAK POWER MANAGEMENT EXTENSIONS TO APPLICATION-SPECIFIC INTEGRATED CIRCUITS

(71) Applicant: MICRON TECHNOLOGY, INC., Boise, ID (US)

(72) Inventors: Liang Yu, Boise, ID (US); Jonathan S. Parry, Boise, ID (US); Chulbum Kim, San Jose, CA (US); Tal Sharifie, Lehavim (IL); Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 117 days.

(21) Appl. No.: 18/503,319

(22) Filed: Nov. 7, 2023

(65) Prior Publication Data

US 2024/0168536 A1 May 23, 2024

Related U.S. Application Data

(60) Provisional application No. 63/426,399, filed on Nov. 18, 2022.

(51) Int. Cl.
*G06F 1/32* (2019.01)
*G06F 1/3225* (2019.01)
*G06F 1/3203* (2019.01)

(52) U.S. Cl.
CPC .......... *G06F 1/3225* (2013.01); *G06F 1/3203* (2013.01)

(58) Field of Classification Search
CPC .... G06F 1/3225; G06F 3/0625; G06F 1/3275; G11C 5/14
USPC ......................................................... 713/320
See application file for complete search history.

(56) References Cited

U.S. PATENT DOCUMENTS

| | | | | |
|---|---|---|---|---|
| 9,455,027 | B1* | 9/2016 | Mattos | G11C 5/14 |
| 2012/0023346 | A1* | 1/2012 | Byom | G11C 16/30 |
| | | | | 713/320 |
| 2019/0138233 | A1* | 5/2019 | Mun | G06F 3/0679 |
| 2021/0217482 | A1* | 7/2021 | Choi | G11C 5/04 |
| 2021/0382804 | A1* | 12/2021 | Alrod | G11C 16/3481 |
| 2022/0148663 | A1* | 5/2022 | Guo | G11C 16/32 |
| 2022/0172767 | A1* | 6/2022 | Yu | G11C 11/4074 |
| 2022/0350505 | A1* | 11/2022 | Guo | G11C 5/147 |
| 2022/0413583 | A1* | 12/2022 | Hassan | G06F 3/0625 |
| 2023/0317179 | A1* | 10/2023 | Abe | G11C 16/32 |
| | | | | 365/185.18 |
| 2025/0068340 | A1* | 2/2025 | Hassan | G06F 3/0625 |

* cited by examiner

*Primary Examiner* — Volvick Derose
(74) *Attorney, Agent, or Firm* — Lowenstein Sandler LLP

(57) ABSTRACT

A memory device includes a set of memory dies, each memory die of the set of memory dies including a memory array and first control logic operatively coupled to the memory array, and an application-specific integrated circuit (ASIC) including a general-purpose input/output component (GPIO) including at least one digital pad communicably coupled to each memory die of the set of memory dies, and second control logic, operatively coupled to memory, to perform operations related to peak power management (PPM).

15 Claims, 17 Drawing Sheets

PEAK POWER MANAGEMENT EXTENSIONS TO APPLICATION-SPECIFIC INTEGRATED CIRCUITS

CROSS-REFERENCE TO RELATED APPLICATION(S)

This application claims the benefit of U.S. Provisional Application 63/426,399, filed on Nov. 18, 2022 and entitled "PEAK POWER MANAGEMENT EXTENSIONS TO APPLICATION-SPECIFIC INTEGRATED CIRCUITS", the entire contents of which are incorporated by reference herein.

TECHNICAL FIELD

Embodiments of the disclosure relate generally to memory sub-systems, and more specifically, relate to implementing peak power management (PPM) extensions to application-specific integrated circuits (ASICs).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
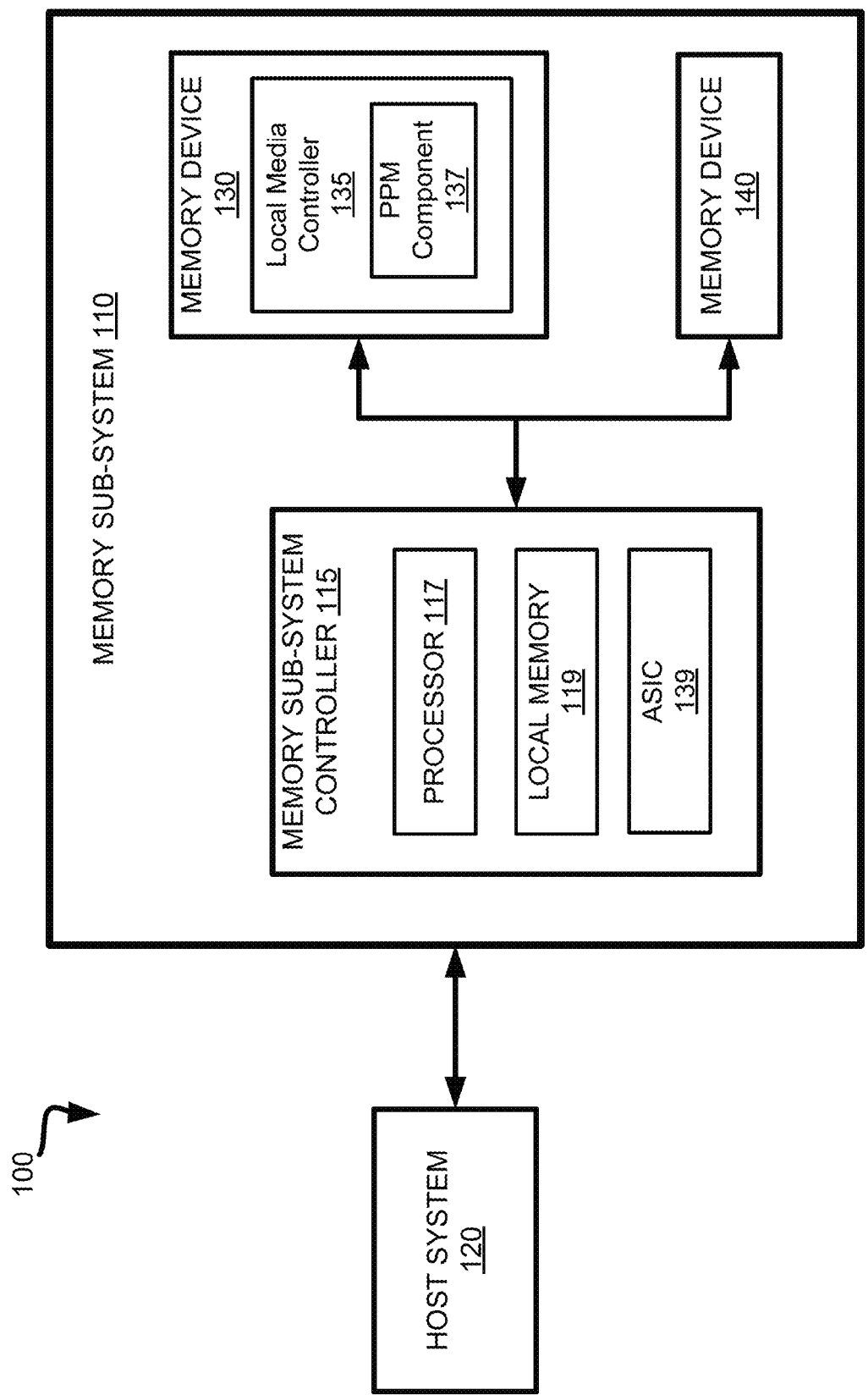
FIG. 1A illustrates an example computing system that includes a memory sub-system in accordance with some embodiments of the present disclosure.

Aspects of the present disclosure are directed to implementing peak power management (PPM) extensions to application-specific integrated circuits (ASICs). A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. The memory cells are formed onto a silicon wafer in an array of columns (also hereinafter referred to as bitlines) and rows (also hereinafter referred to as wordlines). A wordline can refer to one or more conductive lines of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

A memory device can be a three-dimensional (3D) memory device. For example, a 3D memory device can be a three-dimensional (3D) replacement gate memory device (e.g., 3D replacement gate NAND), which is a memory device with a replacement gate structure using wordline stacking. For example, a 3D replacement gate memory device can include wordlines, select gates, etc. located between sets of layers including a pillar (e.g., polysilicon pillar), a tunnel oxide layer, a charge trap (CT) layer, and a dielectric (e.g., oxide) layer. A 3D replacement gate memory device can have a "top deck" corresponding to a first side and a "bottom deck" corresponding to a second side. For example, the first side can be a drain side and the second side can be a source side. Data in a 3D replacement gate memory device can be stored as 1 bit/memory cell (SLC), 2 bits/memory cell (MLC), 3 bits/memory cell (TLC), etc.

Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a memory device can have a high peak current usage, which might be four to five times the average current amplitude. Thus, with such a high average market requirement of total current usage budget, it can become challenging to concurrently operate more than a certain number of memory dies ("dies") of a memory device.

Peak power management (PPM) can be utilized as a technique to manage power consumption of a memory device containing multiple dies, many of which rely on a controller to stagger the activity of the dies seeking to avoid performing high power portions of memory access operations concurrently in more than one die. A PPM system can implement a PPM communication protocol, which is an inter-die communication protocol that can be used for limiting and/or tracking current or power consumed by each die. Each die can include a PPM component that exchanges information with its own local media controller (e.g., NAND controller) and other PPM components of the other dies via a communication bus. Each PPM component can be configured to perform power or current budget arbitration for the respective die. For example, each PPM component can implement predictive PPM to perform predictive power budget arbitration for the respective memory device.

The PPM communication protocol can employ a token-based round robin protocol, whereby each PPM component rotates as a holder of a PPM token in accordance with a token circulation time period. Circulation of the token among the memory devices can be controlled by a common clock signal ("ICLK"). For example, the dies can include a designated primary die that generates the common clock signal received by each active PPM component, with the remaining dies being designated as secondary dies. The token circulation time period can be defined by a number of clock cycles of the common clock signal, and the memory device can pass the token to the next memory device after the number of clock cycles has elapsed.

A die counter can be used to keep track of which die is holding the token. Each die counter value can be univocally associated with a respective die by utilizing a special PPM address for each die. The die counter can be updated upon the passing of the token to the next die.

While holding the token, the PPM component broadcasts, to the other dies, information encoding the amount of current used by its respective die during a given time period (e.g., a quantized current budget). The information can be broadcast using a data line. For example, the data line can be a high current (HC#) data line. The amount of information can be defined by a sequence of bits, where each bit corresponds to the logic level of a data line signal (e.g., an HC# signal) at a respective clock cycle (e.g., a bit has a value of "0" if the HC# signal is logic low during a clock cycle, or a value of "1" if the clock pulse is logic high during a clock cycle). For example, if a die circulates the token after three clock cycles, then the information can include three bits. More specifically, a first bit corresponds to the logic level of the HC# signal during a first clock cycle, a second bit corresponds to the logic level of the HC# signal during a second clock cycle, and a third bit corresponds to the logic level of the HC# signal during the third clock cycle. Accordingly, the token circulation time period (e.g., number of clock cycles) can be defined in accordance with the amount of information to be broadcast by a holder of the token (e.g., number of bits).

While holding the token, the PPM component can issue a request for a certain amount of current to be reserved in order to execute a memory access operation. The system can have a designated maximum current budget, and at least a portion of the maximum current budget may be currently reserved for use by the other memory dies. Thus, an available current budget can be defined as the difference between the maximum current budget and the total amount of reserved current budget during the current token circulation cycle. If the amount of current of the request is less than or equal to the available current budget during the current cycle, then the request is granted and the local media controller can cause the memory access operation to be executed. Otherwise, if the amount of current of the new request exceeds the available current budget, then the local media controller can be forced to wait for sufficient current budget to be made available by the other die(s) to execute the memory access operation (e.g., wait at least one current token circulation cycle).

Each PPM component can maintain the information broadcast by each die (e.g., within respective registers), which enables each die to calculate the current consumption. For example, if there are four dies Die 0 through Die 3, each Die 0 through Die 3 can maintain information broadcast by Die 0 through Die 3 within respective registers designated for Die 0 through Die 3. Since each of Die 0 through Die 3 maintains the maximum current budget the most updated current consumption, each of Die 0 through Die 3 can calculate the available current budget. Accordingly, each of Die 0 through Die 3 can determine whether there is a sufficient amount of available current budget for its local media controller to execute a new memory access operation.

A memory access operation (e.g., program operation, read operation or erase operation) can include multiple sub-operations arranged in an execution sequence. For example, the sub-operations can include an initial sub-operation to initiate the memory access operation, a final sub-operation to complete the memory access operation. The sub-operations can further include at least one intermediate sub-operation performed between the initial sub-operation and the final sub-operation. For each sub-operation, for the local media controller to determine whether there is sufficient available current budget to proceed with execution of the sub-operation, the sub-operation can be assigned a current breakpoint. Each current breakpoint is defined (e.g., as a PPM parameter during initialization of PPM) at the beginning of its respective sub-operation to indicate whether the sub-operation will consume more current, less current, or the same amount of current as the previous sub-operation. Accordingly, current breakpoints can be used as a gating mechanism to control execution of a memory access operation.

For example, a high current (HC) breakpoint indicates that its respective sub-operation will be consuming an amount of current that is greater than the amount of current consumed to execute the previous sub-operation. Thus, the PPM component may have to reserve additional current to enable the local media controller to execute the sub-operation. For example, a first HC breakpoint can be defined with respect to an initial sub-operation of the memory access operation, since the initial sub-operation will necessarily consume a greater amount of current than the zero amount of current that was being consumed immediately before requesting execution of the memory access operation. Upon reaching a HC breakpoint, the local media controller can communicate, with the PPM component, the amount of current that the memory device will be consuming to execute the respective sub-operation. The local media controller waits to receive a response (e.g., flag) indicating that there is sufficient available current budget that can be reserved for executing the respective sub-operation. Upon receiving the response from that PPM component that there is sufficient available current budget that can be reserved for executing the respective sub-operation, the local media controller can proceed with executing the respective sub-operation. Accordingly, the local media controller will execute a sub-operation at a HC breakpoint only if the PPM component indicates that there is sufficient available current in the current budget to do so.

In contrast to a HC breakpoint, a low current (LC) breakpoint indicates that its respective sub-operation will be consuming an amount of current that is less than or equal to the amount of current consumed to execute the previous sub-operation. Since the PPM component had already reserved enough current for executing the previous sub-operation, the local media controller will, upon reaching a LC breakpoint, proceed with executing the respective sub-operation using at least a portion of the already reserved current. However, the local media controller still communicates, with the PPM component, the amount of current that the memory device will be consuming to perform the sub-operation. For example, the PPM component can release an unused portion of the reserved current for the other dies.

Illustratively, if the memory access operation is a read operation, then the read operation can include a prologue sub-operation as the initial sub-operation, a read initialization sub-operation following the prologue sub-operation, a sensing sub-operation following the read initialization sub-operation, and a read recovery sub-operation following the sensing sub-operation. Respective HC breakpoints can be defined for the prologue sub-operation (as the initial sub-operation) and the read initialization sub-operation (since the read initialization sub-operation consumes more current than the prologue sub-operation). Respective LC breakpoints can be defined for the sensing sub-operation (since the sensing sub-operation does not consume more current than the read initialization sub-operation) and the read recovery sub-operation (since the read recovery sub-operation does not consume more current than the sensing sub-operation).

The memory sub-system can include a memory device interface between the memory sub-system controller and a memory device (e.g., NAND memory device) to process multiple different signals relating to one or more transfers or communications with the memory device. For example, the interface can process signals relating to memory access commands (e.g., command/address cycles) to configure the memory device to enable the transfer of raw data in connection with a memory access operation (e.g., a read operation, a program operation, etc.). The interface can implement a multiplexed interface bus including a number of bidirectional input/output (I/O) pins that can transfer address, data and instruction information between the memory sub-system controller and the memory device (e.g., local media controller and I/O control). The I/O pins can be output pins during read operations, and input pins at other times. For example, the interface bus can be an 8-bit bus (I/O [7:0]) or a 16-bit bus (I/O [15:0]).

The interface can further utilize a set of command pins to implement interface protocols. For example, the set of command pins can include a Chip Enable (CE#) pin, an Address Latch Enable (ALE) pin, a Command Latch Enable (CLE) pin, a Write Enable (WE#) pin, a Read Enable (RE#) pin, a data strobe signal (DQS) pin. Additional pins can include, for example, a write protection (WP#) pin that controls hardware write protection, and a ready/busy (RB#) pin that monitors device status and indicates the completion of a memory access operation (e.g., whether the memory device is ready or busy).

The "#" notation indicates that the CE#, WE#, #RE and WP# pins are active when set to a logical low state (e.g., 0 V), also referred to as "active-low" pins. Therefore, the ALE, CLE and DQS pins are active when set to a logical high state (e.g., greater than 0 V), also referred to as "active-high" pins. Asserting a pin can include setting the logical state of the pin to its active logical state, and de-asserting a pin can include setting the logical state of the pin to its inactive logical state. For example, an active-high pin is asserted when set to a logical high state ("driven high") and de-asserted when set to a logical low state ("driven low"), while an active-low pin is asserted when to set to a logical low state ("driven low") and de-asserted when set to a logical high state ("driven high").

CE#, WE#, RE#, CLE, ALE and WP# signals are control signals that can control read and write operations. For example, the CE# pin is an input pin that gates transfers between the host system and the memory device. For example, when the CE# pin is asserted and the memory device is not in a busy state, the memory device can accept command, data and address information. When the memory device is not performing an operation, the CE# pin can be de-asserted.

The RE# pin is an input pin that gates transfers from the memory device to the host system. For example, data can be transferred at the rising edge of RE#. The WE# pin is an input pin that gates transfers from the host system to the memory device. For example, data can be written to a data register on the rising edge of WE# when CE#, CLE and ALE are low and the memory device is not busy.

The ALE pin and the CLE pin are respective input pins. When the ALE pin is driven high, address information can be transferred from the bus into an address register of the memory device upon a low-to-high transition on the WE# pin. More specifically, addresses can be written to the address register on the rising edge of WE# when CE# and CLE are low, ALE is high, and the memory device is not busy. When address information is not being loaded, the ALE pin can be driven low. When the CLE pin is driven high, information can be transferred from the bus to a command register of the memory device. More specifically, commands can be written to the command register on the rising edge of WE# when CE# and ALE are low, CLE is high, and the memory device is not busy. When command information is not being loaded, the CLE pin can be driven low. Accordingly, a high CLE signal can indicate that a command cycle is occurring, and a high ALE signal can indicate that an address input cycle is occurring.

Some memory device operations can be memory array operations. Examples of memory array operations include read operations and write operations. For example, ICC1 can refer to the VCC active current for sequential read operations, and ICC2 can refer to the VCC active current for program operations. Some memory device operations can be data path operations for data paths into, or out of, the memory array (e.g., a data path read operation or a data path write operation). For example, ICC4 can refer to the VCC active current for data path operations (e.g., ICC4R for read operations and ICC4W for write operations).

One type of data path operation is a data burst. A data burst refers to a continuous set of data input or data output transfer cycles that are performed without pause via the data path into or out of the memory array. A data burst can be initiated by specifying a set of parameters including a starting memory address from where to begin the data transfer, and an amount of data to be transferred. After the data burst is initiated, it runs to completion, using as many interface bus transactions as necessary to transfer the amount of data designated by the set of parameters. Due at least in part to specifying the set of parameters, the data burst process can generate an overhead penalty with respect to pre-transfer instruction execution. However, since the data burst can continue without any processor involvement after the initiation, processing resources can be freed up for other tasks. One example of a data burst is a read burst. Another example of a data burst is a write burst.

A plurality of dies can be grouped into respective sets of dies, where each set of dies corresponds to a respective memory channels ("channels") collectively controlled by a controller. Each die of the plurality of dies can correspond to a respective logical unit number (LUN). More specifically, a memory device interface disposed between the controller and the plurality of dies may interpret command packets and provide control signals, address and/or data information to a target die via a specified channel based on the command packets. For each channel, a respective channel control circuit can be operatively coupled to the respective set of dies via a bus for controlling the set of dies. For example, the memory device interface and/or bus can operate under an Open NAND Flash Interface Working Group (ONFI) protocol.

Although memory array operations are typically managed by the PPM protocol described above, data path operations are typically not managed by the PPM protocol. To address this, some systems can pre-reserve, from the available current budget, an amount of current to handle data path operations. More specifically, each channel can be statically assigned a respective amount of current to handle data path operations. The remaining available current budget can be made available to handle the memory array operations, and managed via the PPM protocol.

However, the pre-reserved amount current assigned to the plurality of channels can be determined in accordance with a worst-case scenario assumption regarding the predetermined amount of bus current consumption. In such situations, a potentially large portion of the pre-reserved amount of data path operation current budget can be wasted, which can unnecessarily limit the remaining amount of memory array operation current budget available to the dies to handle memory array operations. This can force dies to wait for current budget to be made available to handle memory array operations in accordance with the PPM protocol. Accordingly, the static data path operation current budget pre-reservation scheme can negatively impact memory array operation performance by causing dies to potentially wait for current budget to be released to handle memory array operations.

Aspects of the present disclosure address the above and other deficiencies by implementing peak power management (PPM) extensions to application-specific integrated circuits (ASICs). Embodiments described herein can enable more efficient management of current budget with respect to a PPM network including a set of dies of a memory device operatively coupled to an ASIC. The ASIC can share its current consumption data during PPM cycles to more accurately track current consumption within the memory device. That is, the ASIC can emulate a die of the set of dies of the PPM network.

To communicate with the set of dies and share current consumption data during PPM cycles, the ASIC can include a GPIO with at least one digital pad ("pad"). In some embodiments, the GPIO includes a pair of pads, where one pad is connected to ICLK and the other pad is connected to HC# to create a PPM network between the ASIC and the set of dies. The ASIC and the set of dies can track the ICLK counter to participate in the PPM token ring and communicate respective current budgets during a PPM cycle. Either the ASIC or one die of the set of dies can be designated as a "primary component" of the PPM network for controlling ICLK. The ASIC and the set of dies can align synchronization setup/hold timing. The ASIC and the set of dies can also be connected to an RB# line for carrying an RB# signal. The RB# signal can be used to enable ICLK synchronization and automatically start/stop PPM for power saving. Further details regarding these embodiments will be described in further detail below with reference to FIGS. 6A-6B.

In some embodiments, the GPIO includes single pad connected to the set of dies. Although each die of the set of dies is connected to ICLK and HC#, the single pad is not connected to ICLK and/or HC#. Thus, the ASIC does not participate directly in the PPM token ring. For example, the GPIO can communicate with the set of dies via one-bit data.

In some embodiments, the GPIO communicates with the set of dies through a calibration pad status change. For example, the calibration pad status change can be a ZQ pad status change. Illustratively, each die of the set of dies can update its ZQ status and recalculate current budget The ASIC and the set of dies can also be connected to an RB# line for carrying an RB# signal. The RB# signal can still be used to enable ICLK synchronization and automatically start/stop PPM for power saving. Further details regarding these embodiments will be described in further detail below with reference to FIGS. 7A-7B.

The ASIC can include a number of components for tracking and reporting current consumption. For example, the ASIC can include a resource manager, a PPM budget tracker and a PPM arbitrator. The resource manager can determine a requested amount of ASIC current consumption. For example, the requested amount of ASIC current consumption can be determined as a sum of individual current consumption requests from multiple sources. The PPM budget tracker can track current consumption data reported by the ASIC 139 and each die of the set of dies 510. The PPM arbitrator can, using the requested amount of ASIC current consumption and the current consumption data reported by each die of the set of dies 510, determine whether the available current budget is sufficient for the requested amount of ASIC current consumption. More specifically, the PPM arbitrator can compare the requested amount of ASIC current consumption to the available current budget within the PPM network. If the available current budget is sufficient (i.e., the difference between the available current budget and the amount of ASIC current consumption is greater than or equal to zero), then the ASIC can reserve the amount of ASIC current consumption from the available current budget, and report the amount of ASIC current consumption to the set of dies via HC#. Otherwise, if the available current budget is insufficient (i.e., the difference between the available current budget and the amount of ASIC current consumption is less than zero), then the ASIC will be forced to wait to reserve the amount of ASIC current consumption until there is sufficient available current budget. Further details regarding ASIC components will be described below with reference to FIGS. 8-9.

In some embodiments, the ASIC can implement phase status tracking. More specifically, the ASIC can receive, from a die of the set of dies, a current consumption value reported by the die during a PPM cycle, and translate the current consumption value into a phase number of a command being executed by the die during the PPM cycle. Each phase number can characterize a respective amount of current consumption during execution of the command. Thus, relationships between phase numbers and current consumption can be maintained in a lookup table stored in the local media controller. For example, translating the current consumption value into the phase number can include comparing the current consumption value reported by the die during the PPM cycle to current consumption data reported by the die during the previous PPM cycle to determine whether there is a change in current consumption value. If so, the ASIC can increment the phase number of the die (otherwise, the ASIC can leave the phase number alone). The ASIC can update the phase number of the die. The phase number of each die of the set of dies can be used by the ASIC to perform priority control arbitration for scheduling purposes. Further details regarding implementing phase status tracking will be described below with reference to FIGS. 10A-10B. Further details regarding implementing PPM extensions to ASICS will be described in further detail below with reference to FIGS. 1A-14.

Advantages of the present disclosure include, but are not limited to, improved memory sub-system performance and QoS. For example, embodiments described herein can improve PPM operation efficiency and system bandwidth.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement PPM extensions to an ASIC 139. In such an embodiment, PPM component 137 can be implemented using hardware or as firmware, stored on memory device 130, executed by the control logic (e.g., local media controller 135). In some embodiments, the memory sub-system controller 115 includes at least a portion of PPM component 137. For example, the memory sub-system controller 115 can include a processor 117 (e.g., a processing device) configured to execute instructions stored in local memory 119 for performing the operations described herein. In some embodiments, and as shown in FIG. 1A, the ASIC 139 is a component of the memory sub-system controller 115. In some embodiments, the ASIC 139 is the memory sub-system controller 115. In some embodiments, the ASIC 139 is included in another component of the memory sub-system 110. In some embodiments, the ASIC 139 is a standalone component of the memory sub-system 110.

Each memory device (e.g., memory device 130 and memory device 140) can correspond to a respective die of a set of dies. To communicate with the set of dies and share current consumption data during PPM cycles, the ASIC 139 can include a GPIO (not shown in FIG. 1A) with at least one digital pad ("pad"). In some embodiments, the GPIO includes a pair of pads, where one pad is connected to ICLK and the other pad is connected to HC# to create a PPM network between the ASIC 139 and the set of dies. The ASIC 139 and the set of dies (via their respective PPM components 137) can track the ICLK counter to participate in the PPM token ring and communicate respective current budgets during a PPM cycle. Either the ASIC 139 or one die of the set of dies can be designated as a "primary component" of the PPM network for controlling ICLK. The ASIC 139 and the set of dies can align synchronization setup/hold timing. The ASIC 139 and the set of dies can also be connected to an RB# line for carrying an RB# signal. The RB# signal can be used to enable ICLK synchronization and automatically start/stop PPM for power saving. Further details regarding these embodiments will be described in further detail below with reference to FIGS. 6A-6B.

In some embodiments, the GPIO includes single pad connected to the set of dies. Although each die of the set of dies is connected to ICLK and HC#, the single pad is not connected to ICLK and/or HC#. Thus, the ASIC 139 does not participate directly in the PPM token ring. For example, the GPIO can communicate with the set of dies via one-bit data. In some embodiments, the GPIO communicates with the set of dies through a calibration pad status change. For example, the calibration pad status change can be a ZQ pad status change. Illustratively, each die of the set of dies can update its ZQ status and recalculate current budget The ASIC 139 and the set of dies can also be connected to an RB# line for carrying an RB# signal. The RB# signal can still be used to enable ICLK synchronization and automatically start/stop PPM for power saving. Further details regarding these embodiments will be described in further detail below with reference to FIGS. 7A-7B.

The ASIC 139 can include a number of components (not shown in FIG. 1A) for tracking and reporting current consumption. For example, the ASIC 139 can include a resource manager, a PPM budget tracker and a PPM arbitrator. The resource manager can determine a requested amount of ASIC current consumption. For example, the requested amount of ASIC current consumption can be determined as a sum of individual current consumption requests from multiple sources. The PPM budget tracker can track current consumption data reported by the ASIC 139 and each die of the set of dies 510. The PPM arbitrator can, using the requested amount of ASIC current consumption and the current consumption data reported by each die of the set of dies 510, determine whether the available current budget is sufficient for the requested amount of ASIC current consumption. More specifically, the PPM arbitrator can compare the requested amount of ASIC current consumption to the available current budget within the PPM network. If the available current budget is sufficient (i.e., the difference between the available current budget and the amount of ASIC current consumption is greater than or equal to zero), then the ASIC can reserve the amount of ASIC current consumption from the available current budget, and report the amount of ASIC current consumption to the set of dies via HC#. Otherwise, if the available current budget is insufficient (i.e., the difference between the available current budget and the amount of ASIC current consumption is less than zero), then the ASIC will be forced to wait to reserve the amount of ASIC current consumption until there is sufficient available current budget. Further details regarding ASIC components will be described below with reference to FIGS. 8-9.

In some embodiments, the ASIC 139 can implement phase status tracking. More specifically, the ASIC 139 can receive, from a die of the set of dies via the PPM component, a current consumption value reported by the die during a PPM cycle, and translate the current consumption value into a phase number of a command being executed by the die during the PPM cycle. Each phase number can characterize a respective amount of current consumption during execution of the command. Thus, relationships between phase numbers and current consumption can be maintained in a lookup table stored in the local media controller. For example, translating the current consumption value into the phase number can include comparing the current consumption value reported by the die during the PPM cycle to current consumption data reported by the die during the previous PPM cycle to determine whether there is a change in current consumption value. If so, the ASIC 139 can increment the phase number of the die (otherwise, the ASIC 139 can leave the phase number alone). The ASIC 139 can update the phase number of the die. The phase number of each die of the set of dies can be used by the ASIC 139 to perform priority control arbitration for scheduling purposes. Further details regarding implementing PPM extensions to ASICs will now be described below with reference to FIGS. 1B-14.

Figure 1B:
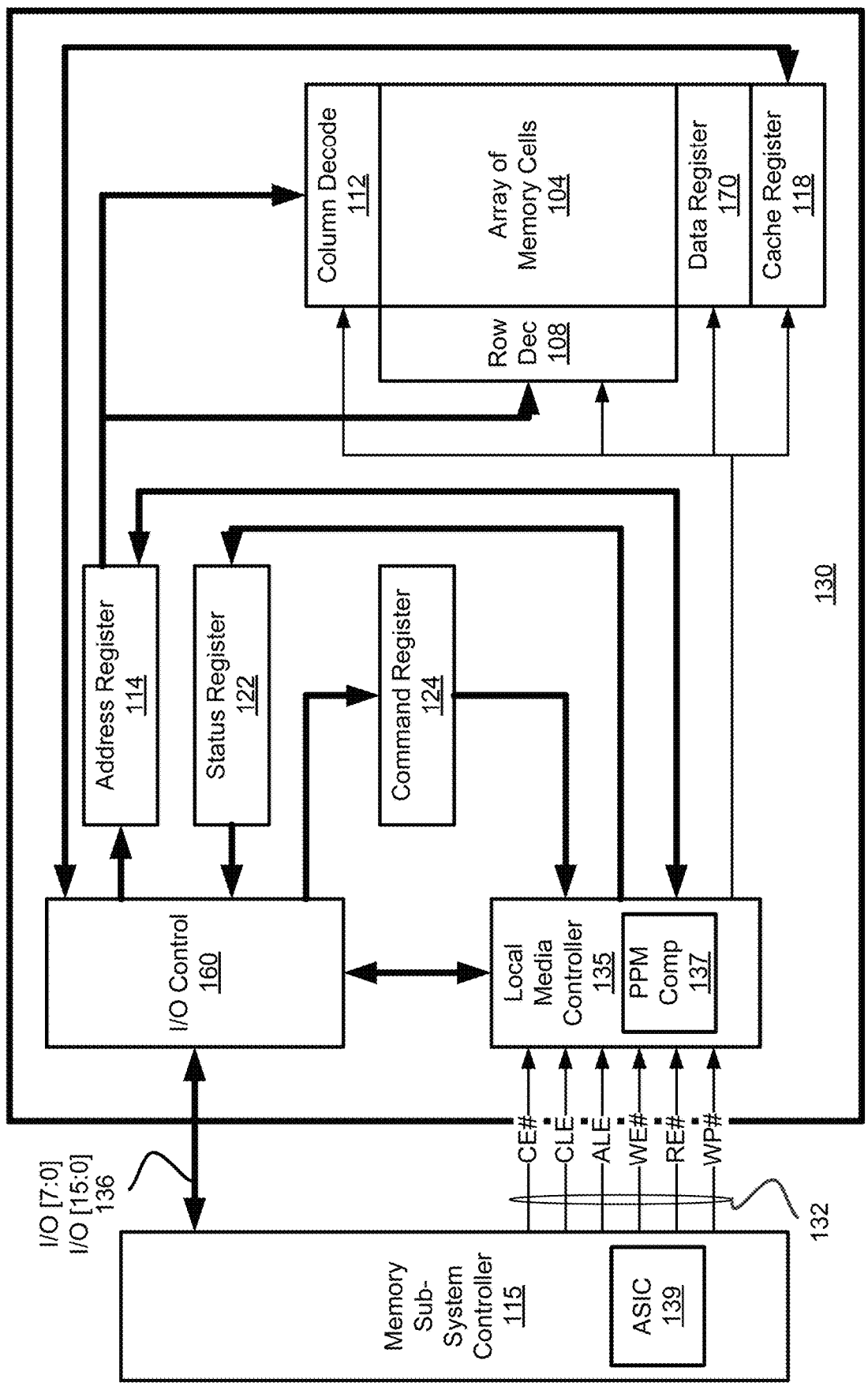
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 112 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 112 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 112 to control the row decode circuitry 108 and column decode circuitry 112 in response to the addresses. In one embodiment, local media controller 135 includes the PPM component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
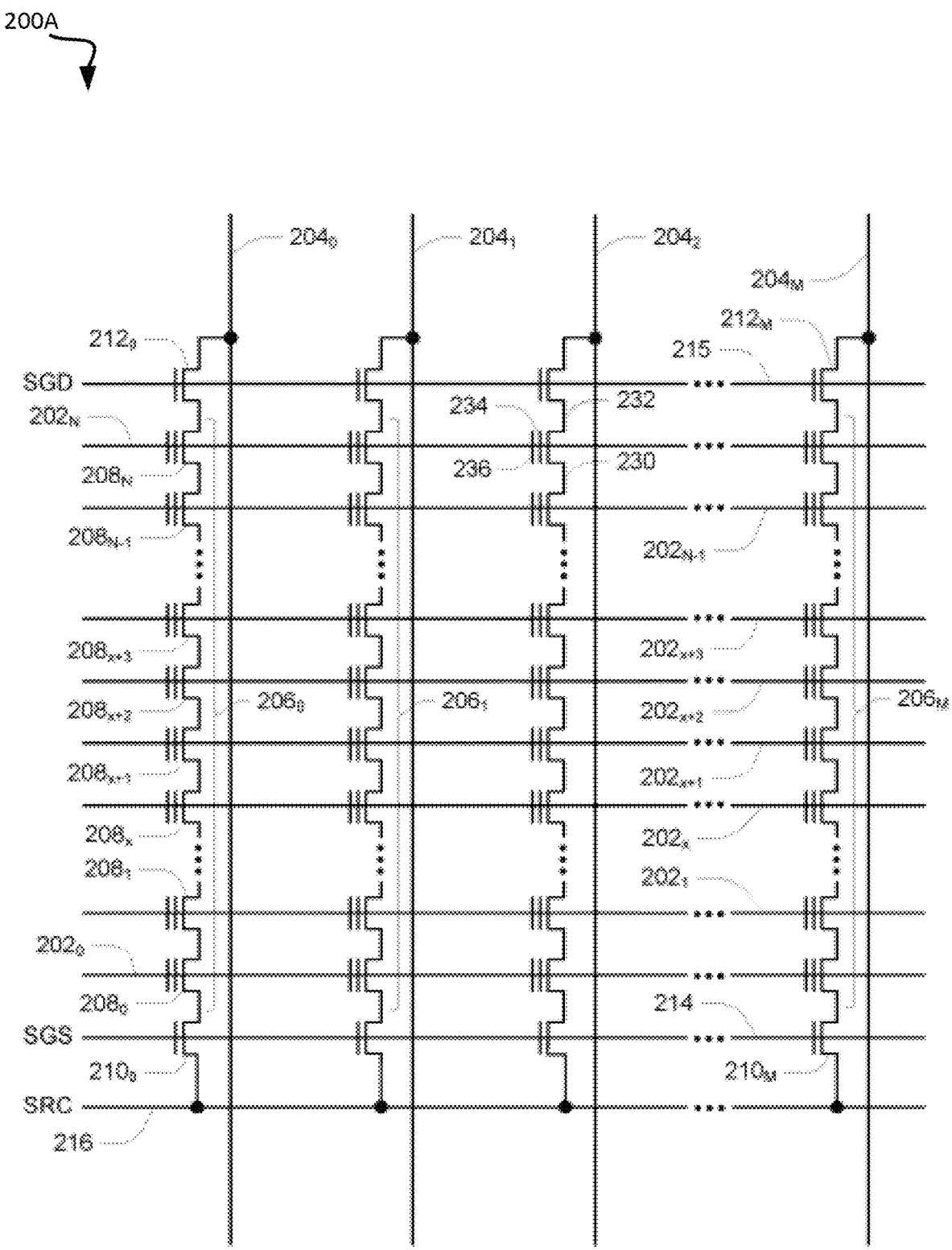
FIGS. 2A-2C are diagrams of portions of an example array of memory cells included in a memory device, in accordance with some embodiments of the present disclosure.
Figure 2B:
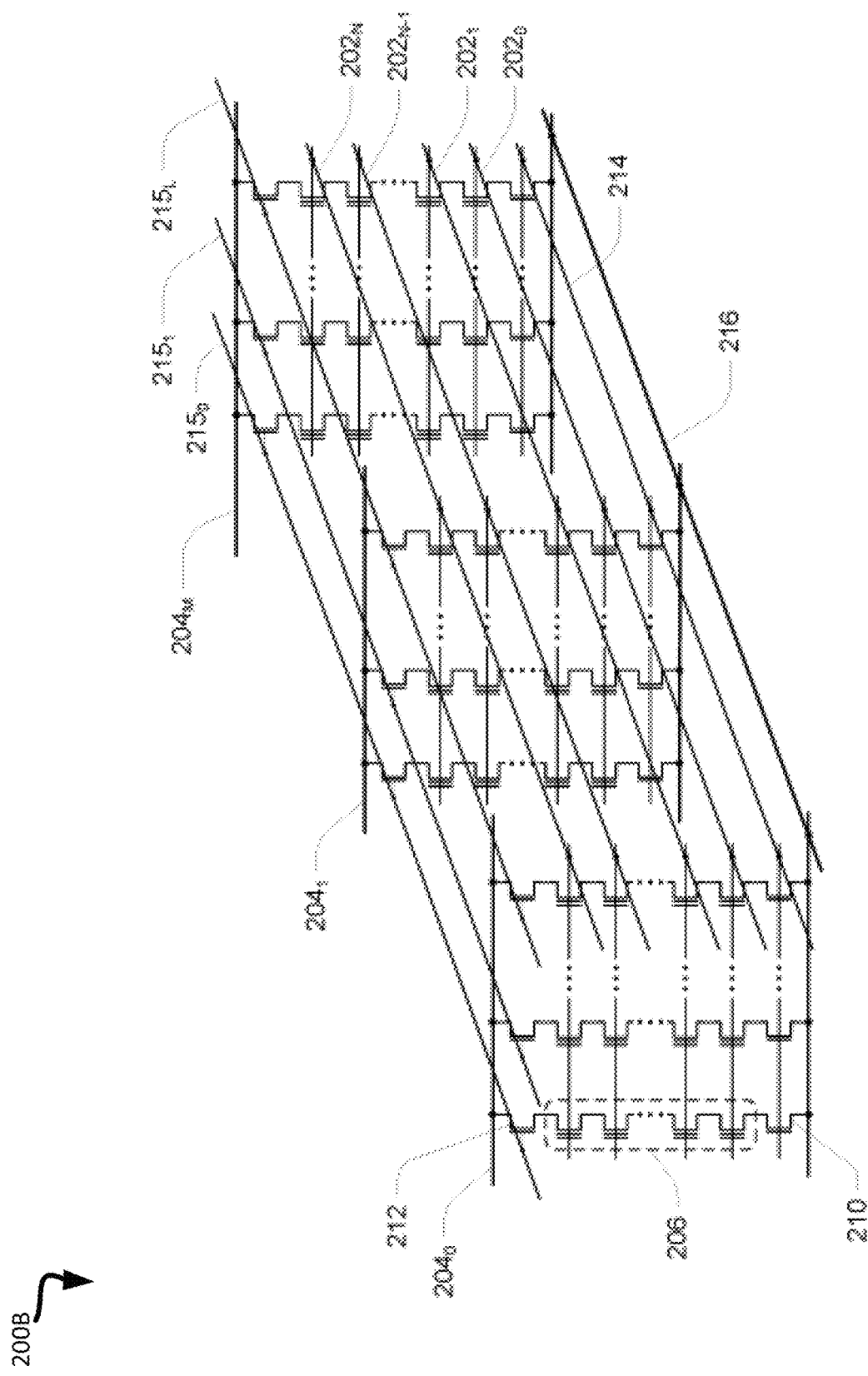
Figure 2C:
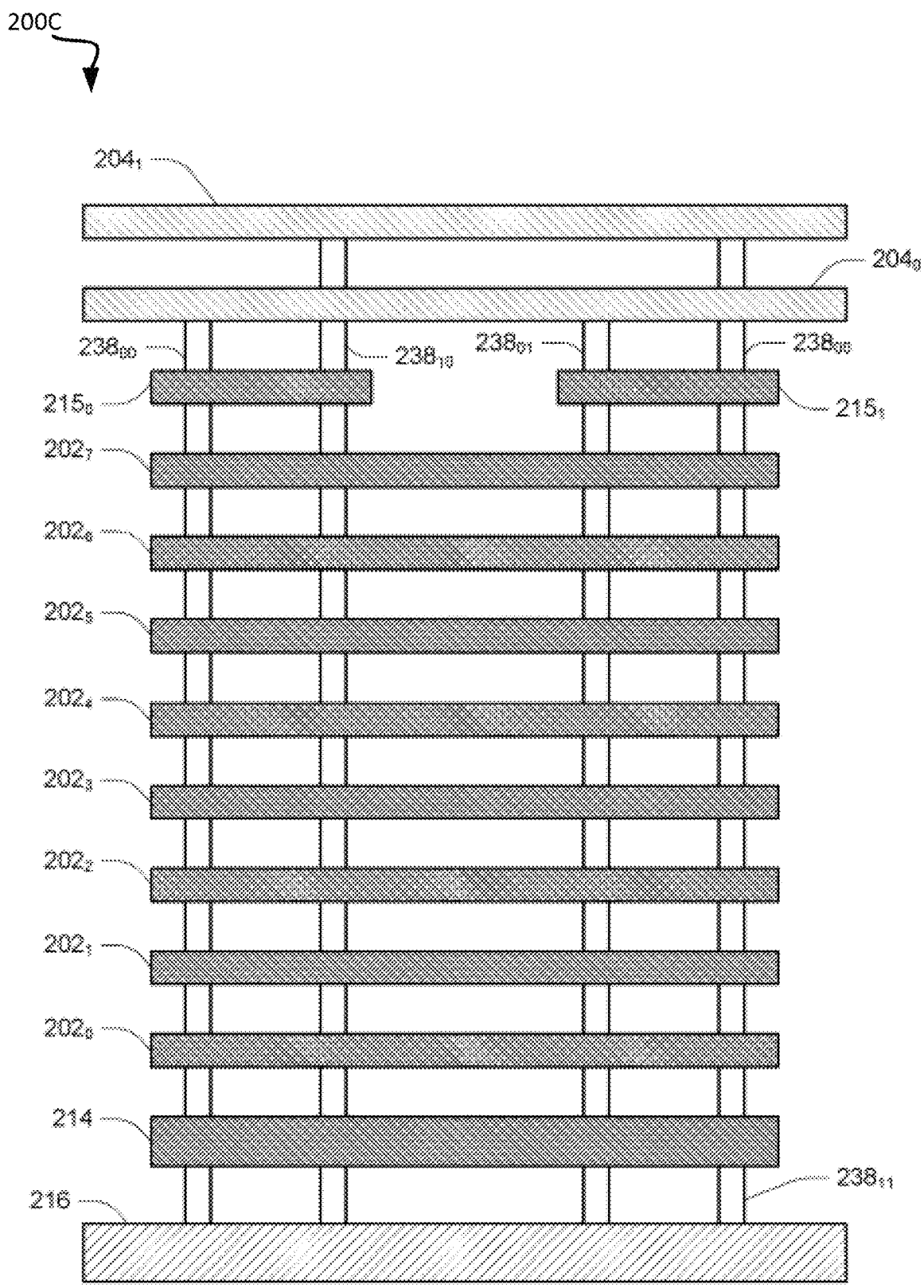

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines 2150-215L to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of a wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
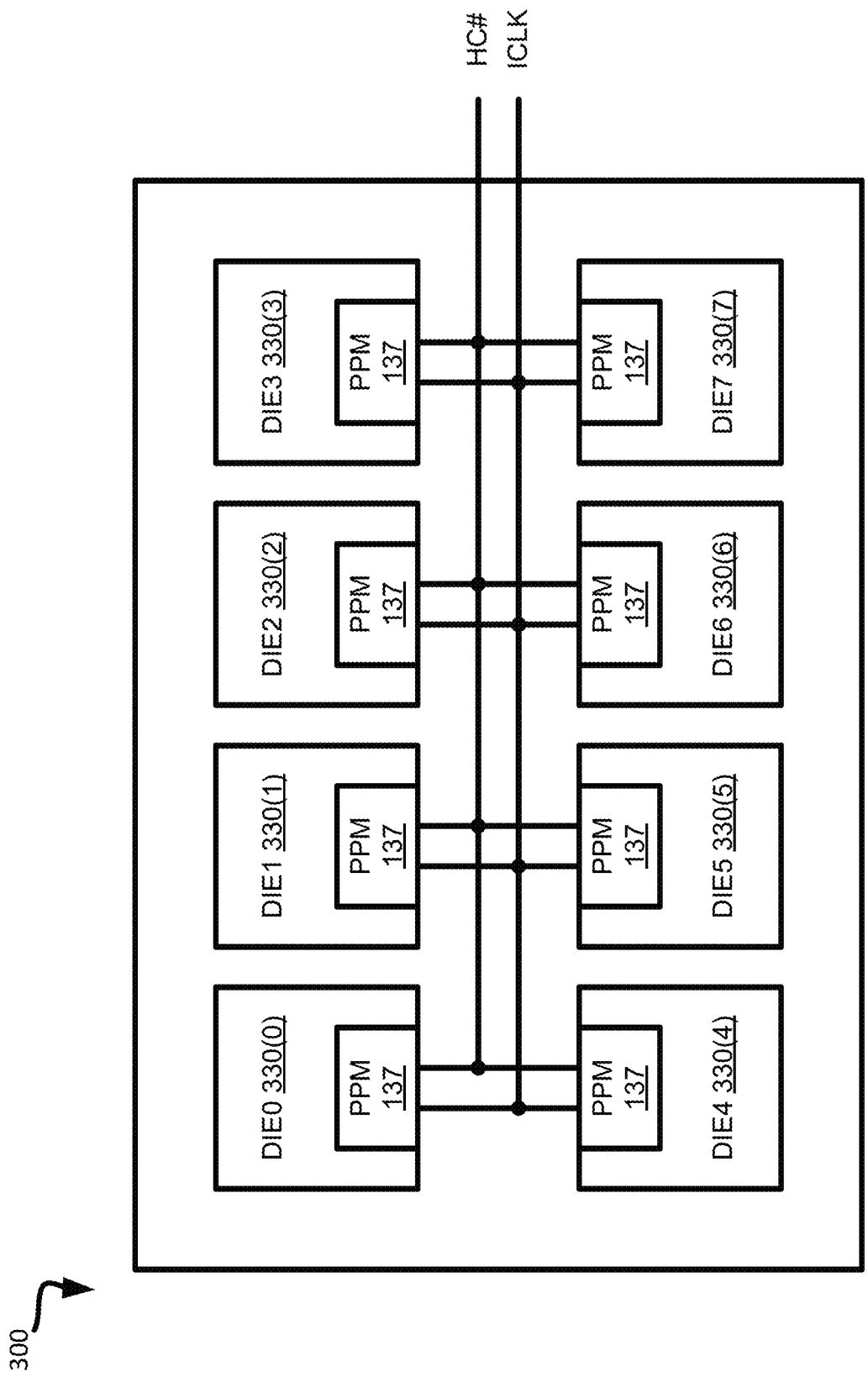
FIG. 3 is a block diagram illustrating a multi-die package with multiple memory dies in a memory sub-system, in accordance with some embodiments of the present disclosure.

FIG. 3 is a block diagram illustrating a multi-die package 300 with multiple memory dies in a memory sub-system, in accordance with some embodiments of the present disclosure. As illustrated, multi-die package 300 includes memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g., via a control link), and can communicate over a separate I/O bus. In addition, a peak current magnitude indicator signal HC# is commonly shared between the memory dies 330(0)-330(7). The peak current magnitude indicator signal HC# can be normally pulled to a particular state (e.g., pulled high). In one embodiment, each of memory dies 330(0)-330(7) includes an instance of PPM component 137, which receives both the clock signal ICLK and the peak current magnitude indicator signal HC#.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given PPM component 137 holds this token (e.g., a certain number of cycles of clock signal ICLK) can be referred to herein as a power management cycle of the associated memory die. At the end of the power management cycle, the token is passed to another memory die. Eventually the token is received again by the same PPM component 137, which signals the beginning of the power management cycle for the associated memory die. In one embodiment, the encoded value for the lowest expected peak current magnitude is configured such that each of its digits correspond to the normal logic level of the peak current magnitude indicator signal HC# where the disabled dies do not transition the peak current magnitude indicator signal HC#. In other embodiments, however, the memory dies can be configured, when otherwise disabled in response to their respective chip enable signal, to drive transitions of the peak current magnitude indicator signal HC# to indicate the encoded value for the lowest expected peak current magnitude upon being designated. When a given PPM component 137 holds the token, it can determine the peak current magnitude for the respective one of memory die 330(0)-330(7), which can be attributable to one or more processing threads on that memory die, and broadcast an indication of the same via the peak current magnitude indicator signal HC#. During a given power management cycle, the PPM component 137 can arbitrate among the multiple processing threads on the respective memory die using one of a number of different arbitration schemes in order to allocate that peak current to enable concurrent memory access operations.

Figure 4:
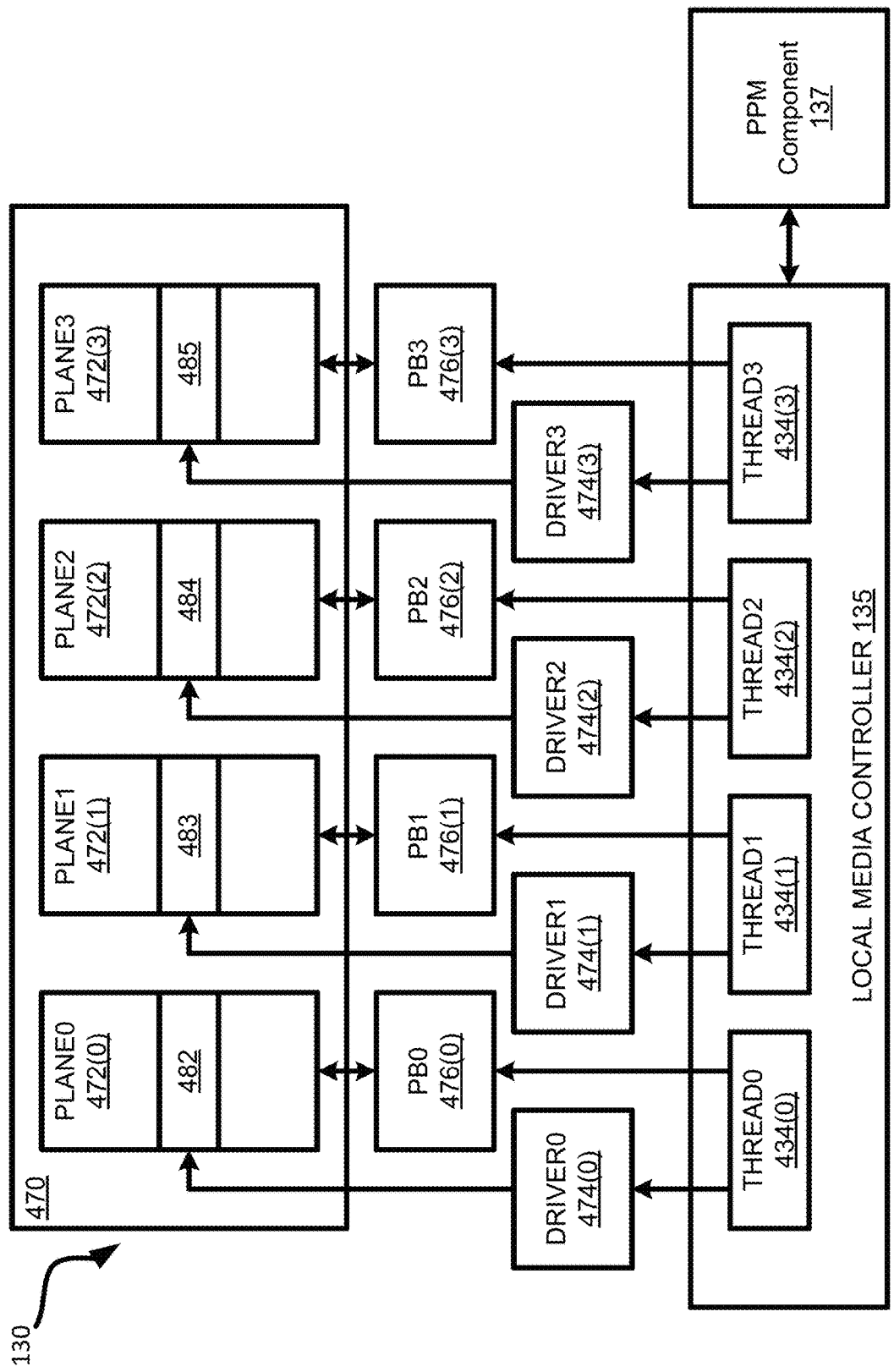
FIG. 4 is a block diagram illustrating a multi-plane memory device configured for independent parallel plane access, in accordance with some embodiments of the present disclosure.

FIG. 4 is a block diagram illustrating a multi-plane memory device 130 configured for independent parallel plane access, in accordance with some embodiments of the present disclosure. The memory planes 472(0)-472(3) can each be divided into blocks of data, with a different relative block of data from two or more of the memory planes 472(0)-472(3) concurrently accessible during memory access operations. For example, during memory access operations, two or more of data block 482 of the memory plane 472(0), data block 483 of the memory plane 472(1), data block 484 of the memory plane 472(2), and data block 485 of the memory plane 4372(3) can each be accessed concurrently.

The memory device 130 includes a memory array 470 divided into memory planes 472(0)-472(3) that each includes a respective number of memory cells. The multi-plane memory device 130 can further include local media controller 135, including a power control circuit and access control circuit for concurrently performing memory access operations for different memory planes 472(0)-472(3). The memory cells can be non-volatile memory cells, such as NAND flash cells, or can generally be any type of memory cells.

The memory planes 472(0)-472(3) can each be divided into blocks of data, with a different relative block of data from each of the memory planes 472(0)-472(3) concurrently accessible during memory access operations. For example, during memory access operations, data block 482 of the memory plane 472(0), data block 483 of the memory plane 472(1), data block 484 of the memory plane 472(2), and data block 485 of the memory plane 472(3) can each be accessed concurrently.

Each of the memory planes 472(0)-372(3) can be coupled to a respective page buffer 476(0)-476(3). Each page buffer 476(0)-376(3) can be configured to provide data to or receive data from the respective memory plane 472(0)-472(3). The page buffers 476(0)-476(3) can be controlled by local media controller 135. Data received from the respective memory planes 472(0)-472(3) can be latched at the page buffers 476(0)-476(3), respectively, and retrieved by local media controller 135, and provided to the memory sub-system controller 115 via the interface.

Each of the memory planes 472(0)-472(3) can be further coupled to a respective access driver circuit 474(0)-474(3), such as an access line driver circuit. The driver circuits 474(0)-474(3) can be configured to condition a page of a respective block of an associated memory plane 472(0)-472(3) for a memory access operation, such as programming data (i.e., writing data), reading data, or erasing data. Each of the driver circuits 474(0)-474(3) can be coupled to a respective global access lines associated with a respective memory plane 472(0)-472(3). Each of the global access lines can be selectively coupled to respective local access lines within a block of a plane during a memory access operation associated with a page within the block. The driver circuits 474(0)-474(3) can be controlled based on signals from local media controller 135. Each of the driver circuits 474(0)-474(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 474(0)-474(3) and page buffers 476(0)-476(3) to concurrently perform memory access operations associated with each of a group of memory command and address pairs (e.g., received from memory sub-system controller 115). For example, local media controller 135 can control the driver circuits 474(0)-474(3) and page buffer 476(0)-476(3) to perform the concurrent memory access operations. Local media controller 135 can include a power control circuit that serially configures two or more of the driver circuits 474(0)-474(3) for the concurrent memory access operations, and an access control circuit configured to control two or more of the page buffers 476(0)-476(3) to sense and latch data from the respective memory planes 472(0)-472(3), or program data to the respective memory planes 472(0)-472(3) to perform the concurrent memory access operations.

In operation, local media controller 135 can receive a group of memory command and address pairs via the bus, with each pair arriving in parallel or serially. In some examples, the group of memory command and address pairs can each be associated with different respective memory planes 472(0)-472(3) of the memory array 470. The local media controller 135 can be configured to perform concurrent memory access operations (e.g., read operations or program operations) for the different memory planes 472(0)-472(3) of the memory array 470 responsive to the group of memory command and address pairs. For example, the power control circuit of local media controller 135 can serially configure, for the concurrent memory access operations based on respective page type (e.g., UP, TP, LP, XP, SLC/MLC/TLC/QLC page), the driver circuits 474(0)-474(3) for two or more memory planes 472(0)-472(3) associated with the group of memory command and address pairs. After the access line driver circuits 474(0)-474(3) have been configured, the access control circuit of local media controller 135 can concurrently control the page buffers 476(0)-476(3) to access the respective pages of each of the two or more memory planes 472(0)-472(3) associated with the group of memory command and address pairs, such as retrieving data or writing data, during the concurrent memory access operations. For example, the access control circuit can concurrently (e.g., in parallel and/or contemporaneously) control the page buffers 476(0)-476(3) to charge/discharge bitlines, sense data from the two or more memory planes 472(0)-472(3), and/or latch the data.

Based on the signals received from local media controller 135, the driver circuits 474(0)-474(3) that are coupled to the memory planes 472(0)-472(3) associated with the group of memory command and address command pairs can select blocks of memory or memory cells from the associated memory plane 472(0)-472(3), for memory array operation s, such as read, program, and/or erase operations. The driver circuits 474(0)-474(3) can drive different respective global access lines associated with a respective memory plane 472(0)-472(3). As an example, the driver circuit 474(0) can drive a first voltage on a first global access line associated with the memory plane 472(0), the driver circuit 474(1) can drive a second voltage on a third global access line associated with the memory plane 472(1), the driver circuit 474(2) can drive a third voltage on a seventh global access line associated with the memory plane 472(2), etc., and other voltages can be driven on each of the remaining global access lines. In some examples, pass voltages can be provided on all access lines except an access line associated with a page of a memory plane 472(0)-472(3) to be accessed. The local media controller 135, the driver circuits 474(0)-474(3) can allow different respective pages, and the page buffers 476(0)-476(3) within different respective blocks of memory cells, to be accessed concurrently. For example, a first page of a first block of a first memory plane can be accessed concurrently with a second page of a second block of a second memory plane, regardless of page type.

The page buffers 476(0)-476(3) can provide data to or receive data from the local media controller 135 during the memory access operations responsive to signals from the local media controller 135 and the respective memory planes 472(0)-472(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 474(0)-474(3) can concurrently access different respective pages within different respective blocks of different memory planes when the different respective pages are of a different page type. For example, local media controller 135 can include a number of different processing threads, such as processing threads 434(0)-434(3). Each of processing threads 434(0)-434(3) can be associated with a respective one of memory planes 472(0)-472(3), or a respective group of memory planes, and can manage operations performed on the respective plane or group of planes. For example, each of processing threads 434(0)-434(3) can provide control signals to the respective one of driver circuits 474(0)-474(3) and page buffers 476(0)-476(3) to perform those memory access operations concurrently (e.g., at least partially overlapping in time). Since the processing threads 434(0)-434(3) can perform the memory access operations, each of processing threads 434(0)-434(3) can have different current requirements at different points in time. PPM component 137 can determine the power budget needs of processing threads 434(0)-434(3) in a given power management cycle and identify one or more of processing threads 434(0)-434(3) using one of a number of power budget arbitration schemes described herein. The one or more processing threads 434(0)-434(3) can be determined based on an available power budget in the memory sub-system 110 during the power management cycles. For example, PPM component 137 can determine respective priorities of processing threads 434(0)-434(3), and allocate current to processing threads 434(0)-434(3) based on the respective priorities.

Figure 5A:
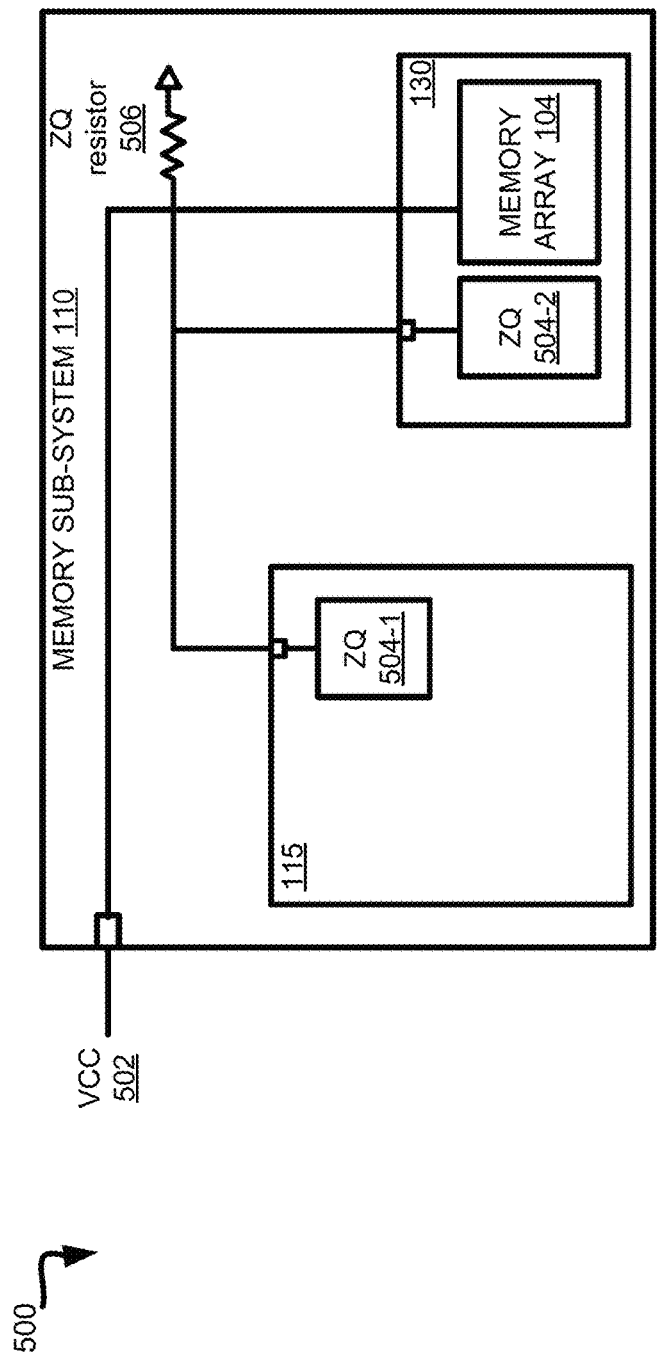
FIG. 5A is a block diagram of an overview of an example system including a VCC power rail, in accordance with some embodiments of the present disclosure.
Figure 5B:
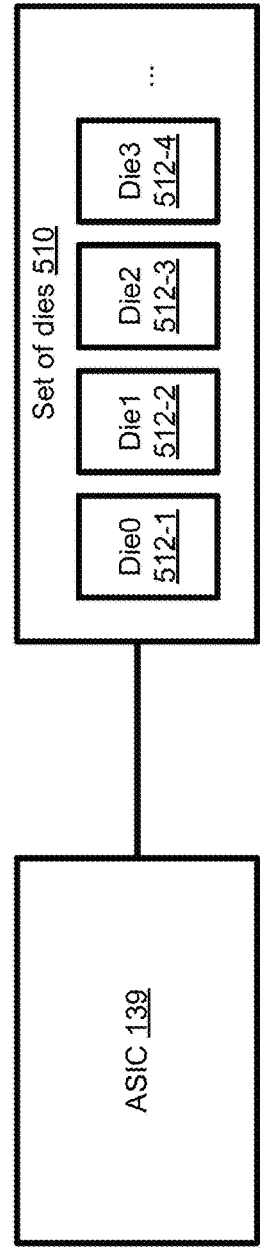
FIG. 5B is a block diagram of an overview of an example system for implementing peak power management (PPM) extensions to application-specific integrated circuits (ASICs), in accordance with some embodiments of the present disclosure.

FIGS. 5A-5B are block diagrams of an example system 500 including a PPM network for implementing PPM extensions to ASICs, in accordance with some embodiments of the present disclosure. As shown in FIG. 5A, the system 500 can include the memory sub-system 110, the memory sub-system controller 115, the memory device 130, the memory array 104 and the local media controller 135 described above with reference to FIGS. 1A-1B. In some embodiments, the memory sub-system 110 is a UFS drive and the memory sub-system controller 115 is a UFS controller. The system 500 can further include a VCC power rail 502 connected to the memory sub-system 110. More specifically, the VCC power rail 502 can be operatively coupled to the memory array 104 to provide current to a set of dies of a PPM network for performing memory array operations and/or data path operations. The memory sub-system controller 115 can include a calibration circuit 504-1 and a calibration circuit 504-2 each operatively coupled to at least one calibration resistor 506. The calibration circuit 504-1 can include one or more resistors (not shown). In some embodiments, and as shown, the calibration circuit 504-1 and the calibration circuit 504-2 are ZQ calibration circuits ("ZQ") and the calibration resistors 506-1 and 506-2 are ZQ resistors. ZQ communication can be digital communication.

As shown in FIG. 5B, the system 500 can further include the ASIC 139 communicably coupled to a set of dies 510 to implement PPM extensions. For example, the ASIC 139 can implement a PPM extension to power consumption at least with respect to the VCC power rail 502. More specifically, the set of dies 510 can include Die0 512-1, Die1 512-2, Die2 512-3 and Die4 512-4. Each of the dies can correspond to a respective LUN. Although four dies are shown, the set of dies 510 can include any number of dies. The ASIC 139 and the set of dies 510 can form a PPM network. In some embodiments, the PPM network includes a plurality of channels, and each channel of the plurality of channels includes a respective subset of the set of dies 510.

For example, the ASIC 139 can include at least one general-purpose input/output (GPIO) pad to communicate with each die of the set of dies 510. In some embodiments, the ASIC 139 includes a pair of GPIO pads (not shown in FIG. 5B). A first pad of the pair of GPIO pads can be communicably coupled to the ICLK pad of each die of the set of dies 510. A second pad of the pair of GPIO pads can be coupled to the HC# pad of each die of the set of dies 510. The ASIC 139 and the set of dies 510 each track the die counter controlled by the ICLK signal. In some embodiments, a primary die of the set of dies 510 generates the ICLK signal (e.g., Die0 512-1). In some embodiments, the ASIC 139 generates the ICLK signal. The ASIC 139 and the set of dies 510 can further receive an RB# signal to enable ICLK synchronization and automatic power saving functionality. Further details regarding these embodiments will be described below with reference to FIGS. 6A-6B and 11.

In some embodiments, the ASIC 139 includes a single GPIO pad (not shown in FIG. 5B). The single GPIO pad can enable one-way communication from the ASIC 139 to the set of dies 510. More specifically, the ASIC 139 can provide logic information to the set of dies 510 through a ZQ pad status change via the single GPIO pad. In some embodiments, the logic information includes one bit information. Each die can update ZQ status on a breakpoint (or some clock counter) to recalculate the available current budget. In these embodiments, the ASIC 139 may not be coupled to the ICLK and/or HC# pads (i.e., only the dies of the set of dies 510 are coupled to the ICLK and/or HC# pads). The ASIC 139 and the set of dies 510 can further receive an RB# signal to enable ICLK synchronization and automatic power saving functionality. Further details regarding these embodiments will be described below with reference to FIGS. 7A-7B and 11.

In addition to the GPIO, the ASIC 139 can include other components that can be used to implement PPM extensions to the ASIC 139. In some embodiments, the other components include a resource manager, a PPM arbitrator and a PPM budget tracker. Further details regarding these embodiments will be described below with reference to FIGS. 8-9 and 11.

In some embodiments, the PPM network can track memory array operation phase status. The current consumption of each die can be translated into a phase of a memory array operation. More specifically, the ASIC 139 can internally track the current consumption value of the ASIC 139 and each die of the set of dies 510 across PPM cycles. For each die, the ASIC 139 can determine, for a current PPM cycle whether there was a change to the current consumption value reported by the die with respect to the previous PPM cycle. If there is a change, then the ASIC 139 can increment the phase number for the die (otherwise, there is no phase number change). The ASIC 139 can then use the phase numbers of each die to perform prior control arbitration, which can be used for priority control scheduling regarding the memory array operations being performed by each die. As an illustrative example, assume that Die0 512-1 has received a program command. The current consumption value reported by Die0 512-1 during a first PPM cycle can indicate Phase 0 of the program operation (e.g., a current consumption value indicated by the three-bit value "111"). The current consumption value reported by Die0 512-1 during a second PPM cycle can indicate Phase 1 of the program operation (e.g., a current consumption value indicated by the three-bit value "101"). Thus, the ASIC 139 can determine that there was a change to the current consumption value, and can increment the phase number from 0 to 1. Further details regarding these embodiments will be described below with reference to FIGS. 10A-10B and 12.

Figure 6A:
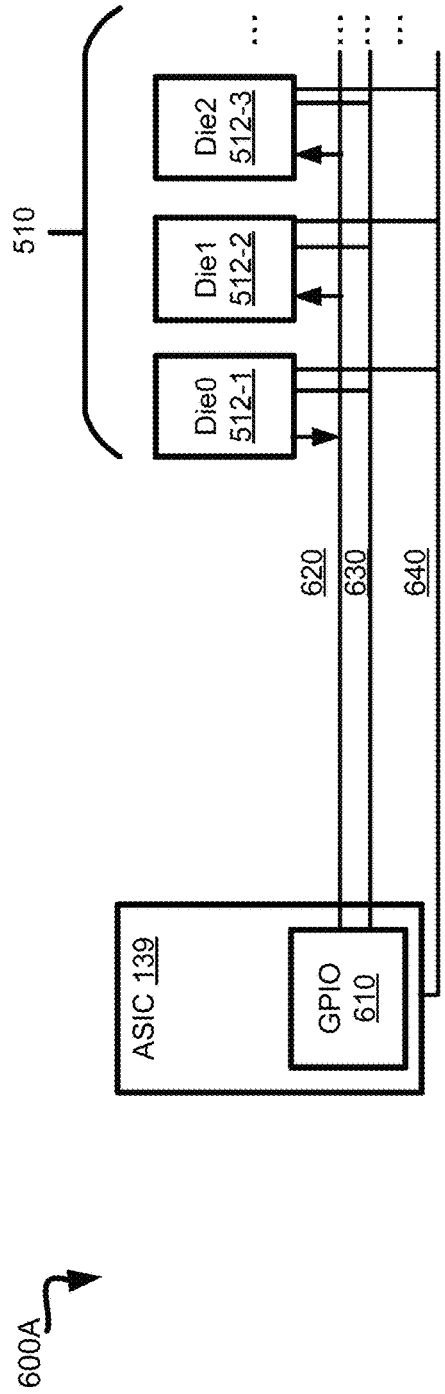
FIGS. 6A-6B are diagrams of an example system for implementing peak power management (PPM) extensions to application-specific integrated circuits (ASICs), in accordance with some embodiments of the present disclosure.

FIG. 6A is a diagram of an example PPM network 600A of a memory device for implementing PPM extensions to ASICs, in accordance with some embodiments of the present disclosure. As shown, the PPM network 600A includes the ASIC 139 and the set of dies 510 including Die0 512-1 through Die2 512-3. The ASIC 139 and the set of dies 510 collectively form a PPM network. The ASIC 139 includes a GPIO 610. The GPIO 610 includes a pair of pads, in which a first pad is connected to an ICLK line 620 and a second pad is connected to an HC# line 630. The lines 620 and 630 are also connected to each die of the set of dies 510. In this example, it is assumed that Die0 510-1 is designated as a primary die controlling the ICLK signal via the ICLK line 620. However, such an embodiment should not be considered limiting. For example, the ASIC 139 can control the ICLK signal. As another example, a different die of the set of dies 510 can be designated as the primary die. The ASIC 139 and each die of the set of dies 510 are further connected to an RB# line 640. An RB# signal can start/stop the ICLK signal for power saving.

Figure 6B:
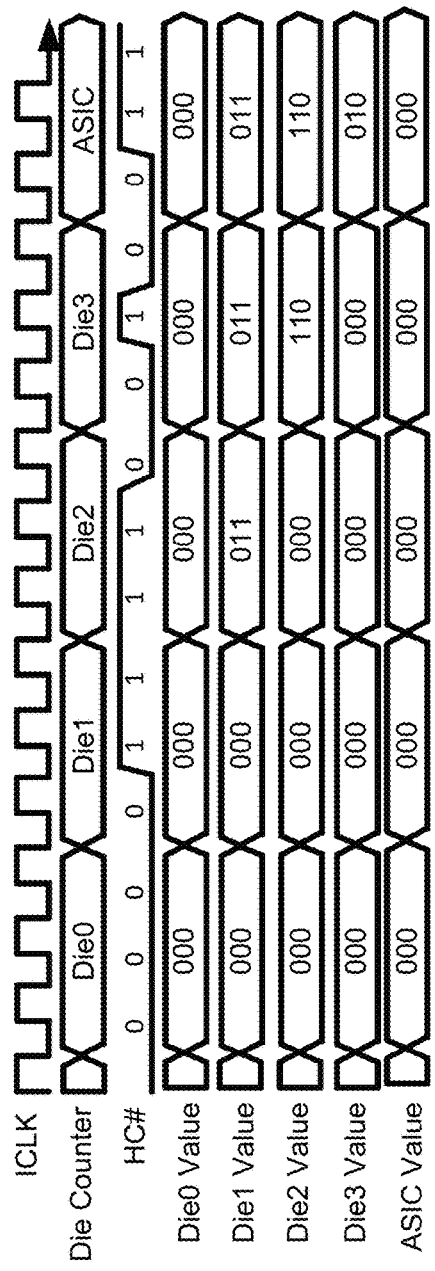

FIG. 6B is a diagram 600B illustrating reporting of current consumption values of components of the PPM network 600A during a PPM cycle, in accordance with some embodiments of the present disclosure. The diagram 600B shows an ICLK signal ("ICLK"), a die counter ("Die Counter"), an HC# signal ("HC#"), a current consumption value reported by Die0 510-1 ("Die0 Value"), a current consumption value reported by Die1 510-2 ("Die1 Value"), a current consumption value reported by Die2 510-3 ("Die2 Value"), a current consumption value reported by Die3 510-4 ("Die3 Value"), and a current consumption value reported by the ASIC 139 ("ASIC Value"). More specifically, each current consumption value is indicated by a three-bit value. However, such an example should not be considered limiting.

In this example, it is assumed here that the ASIC 139 and each of die of the set of dies 510-1 reports a current consumption value indicated by the three-bit value "000". It is assumed that Die0 512-1 is the first component of the PPM network 600A in possession of the token during the current PPM cycle. During the current PPM cycle, Die0 512-1 reports, via HC# to the other components of the PPM network 600A (e.g., ASIC 139 and the other dies of the set of dies 510), a Die0 Value of "000" (i.e., no change in Die current consumption). After reporting the Die0 Value, Die0 512-1 passes the token to Die1 512-2. After receiving the token, Die1 512-2 reports, via HC# to the other components of the PPM network 600A, a Die1 Value of "011" (i.e., a change in Die1 current consumption). After reporting the Die1 Value, Die1 512-2 passes the token to Die2 512-3. After receiving the token, Die2 512-3 reports, via HC# to the other components of the PPM network 600A, a Die2 Value of "110" (i.e., a change in Die2 current consumption). After reporting the Die2 Value, Die2 512-3 passes the token to Die3 512-4. After receiving the token, Die3 512-4 reports, via HC# to the other components of the PPM network 600A, a Die3 Value of "010" (i.e., a change in Die3 current consumption). After reporting the Die3 Value, Die3 512-4 passes the token to the ASIC 139. After receiving the token, the ASIC 139 reports, via HC# to the other components of the PPM network 600A, an ASIC Value of "011" (i.e., a change in ASIC current consumption).

Figure 7A:
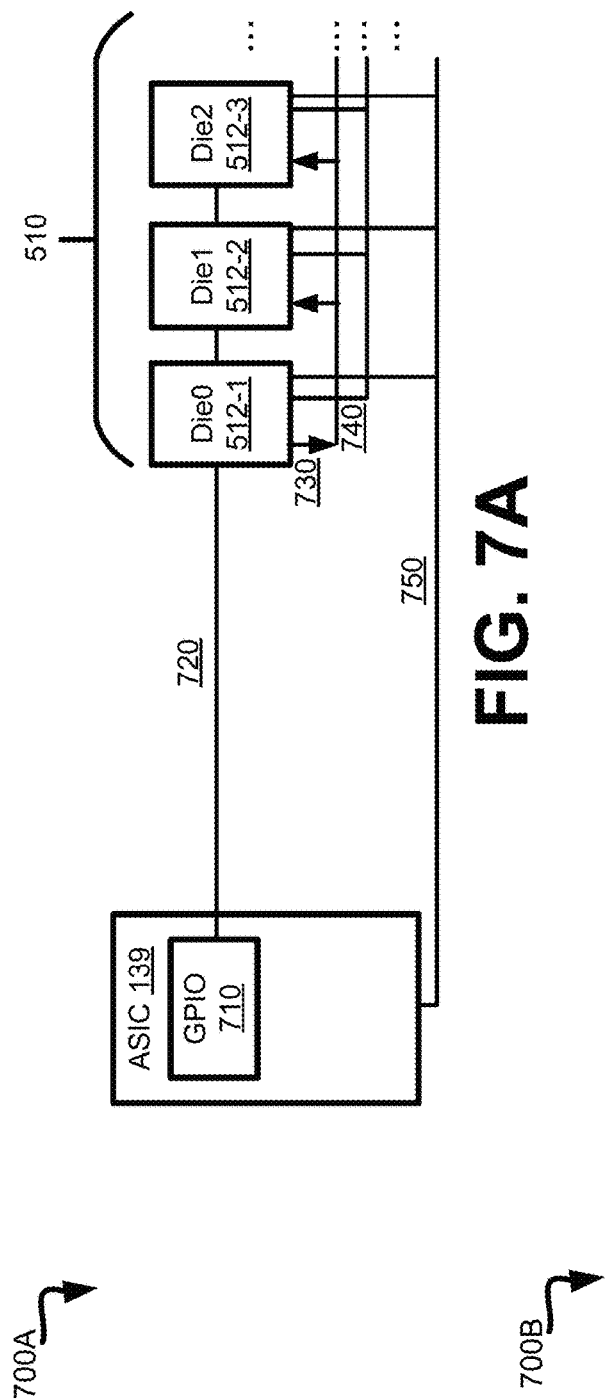
FIGS. 7A-7B are diagrams of an example system for implementing peak power management (PPM) extensions to application-specific integrated circuits (ASICs), in accordance with some embodiments of the present disclosure.

FIG. 7A is a diagram of an example PPM network 700A of a memory device for implementing PPM extensions to ASICs, in accordance with some embodiments of the present disclosure. As shown, the PPM network 700A includes the ASIC 139 and the set of dies 510 including Die0 512-1 through Die2 512-3. The ASIC 139 and the set of dies 510 collectively form a PPM network. The ASIC 139 includes a GPIO 710. The GPIO 710 includes a single pad connected to a link 720 to establish communication to the set of dies 510. For example, the link 720 can enable one-way communication from the ASIC 139 to the set of dies 510. The link 720 provides logic information via ZQ pad status change. In some embodiments, the logic information includes one-bit information (i.e., "0" or "1"). For example, the logic information can be predicted logic information. The PPM network 700A further includes ICLK line 730, HC# line 740 and RB# line 750, similar to ICLK line 620, HC# line 630 and RB# line 640, respectively, of the PPM network 600A of FIG. 6A. However, in the PPM network 700A, lines 730 and 740 are not connected to the ASIC 139. In this example, it is assumed that Die0 510-1 is designated as a primary die controlling the ICLK signal via the ICLK line 730. However, such an embodiment should not be considered limiting. For example, a different die of the set of dies 510 can be designated as the primary die. Each die of the set of dies 510 can update its ZQ status, which can be used to recalculate the available current budget.

Figure 7B:
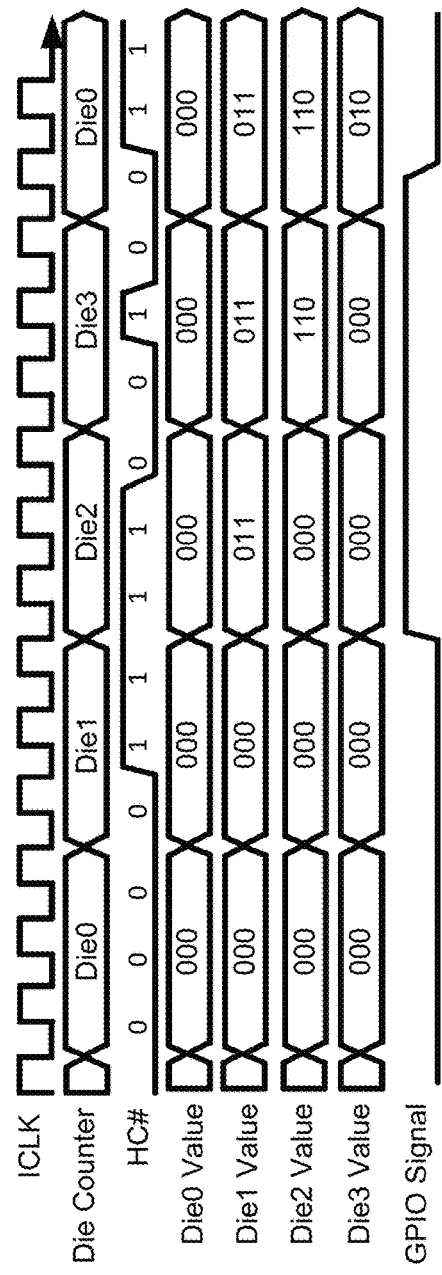

FIG. 7B is a diagram 700B illustrating reporting of current consumption values of components of the PPM network 700A during a PPM cycle, in accordance with some embodiments of the present disclosure. Similar to the diagram 600B of FIG. 6B, the diagram 700B shows an ICLK signal ("ICLK"), a die counter ("Die Counter"), an HC# signal ("HC#"), a current consumption value reported by Die0 510-1 ("Die0 Value"), a current consumption value reported by Die1 510-2 ("Die1 Value"), a current consumption value reported by Die2 510-3 ("Die2 Value"), and a current consumption value reported by Die3 510-4 ("Die3 Value"). However, in this example, there is no current consumption value reported by the ASIC 139 ("ASIC Value") since the ASIC 139 is not connected to ICLK line 730 and HC# line 740 (i.e., is not included in the token ring). Instead, the diagram 700B shows the GPIO signal sent via the line 720 ("GPIO Signal").

In this example, it is assumed here that each of die of the set of dies 510-1 reports a current consumption value indicated by the three-bit value "000" and that the GPIO Signal is low (e.g., "0"). It is assumed that Die0 512-1 is the first component of the PPM network 700A in possession of the token during the current PPM cycle. During the current PPM cycle, Die0 512-1 reports, via HC# to the other components of the PPM network 700A (e.g., ASIC 139 and the other dies of the set of dies 510), a Die0 Value of "000" (i.e., no change in Die0 current consumption). After reporting the Die0 Value, Die0 512-1 passes the token to Die1 512-2. After receiving the token, Die1 512-2 reports, via HC# to the other components of the PPM network 700A, a Die1 Value of "011" (i.e., a change in Die1 current consumption). During this time, the GPIO Signal is still low. After reporting the Die1 Value, Die1 512-2 passes the token to Die2 512-3 and the GPIO Signal goes high (e.g., to "1"). After receiving the token, Die2 512-3 reports, via HC# to the other components of the PPM network 600A, a Die2 Value of "110" (i.e., a change in Die2 current consumption). After reporting the Die2 Value, Die2 512-3 passes the token to Die3 512-4. During this time, the GPIO Signal is still high. After receiving the token, Die3 512-4 reports, via HC# to the other components of the PPM network 600A, a Die3 Value of "010" (i.e., a change in Die3 current consumption). After reporting the Die3 Value, Die3 512-4 passes the token to Die0 512-1 to begin the next PPM cycle and the GPIO Signal goes low again. After receiving the token, Die0 512-1 reports, via HC# to the other components of the PPM network 600A, a Die0 Value of "011" (i.e., a change in ASIC current consumption).

Figure 8:
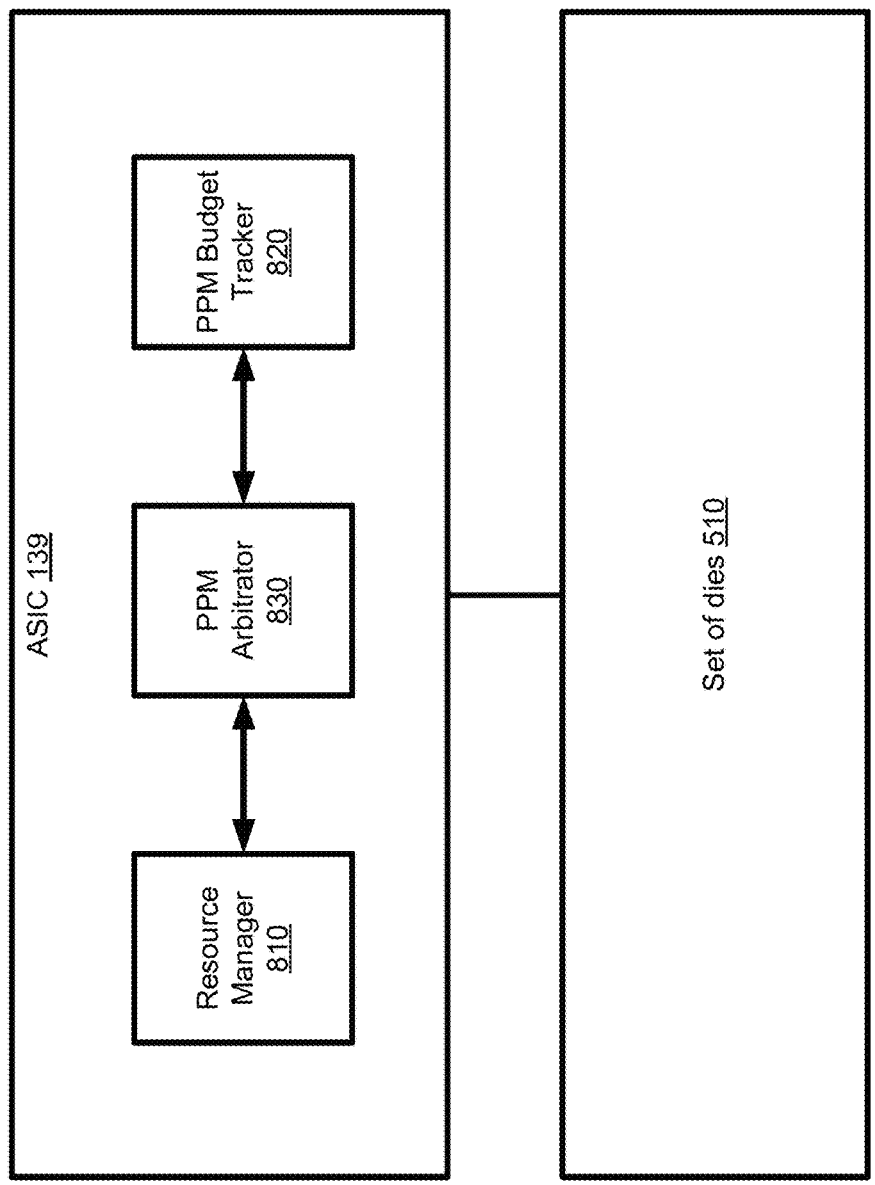
FIG. 8 is a block diagram of example system including an application-specific integrated circuit (ASIC), in accordance with some embodiments of the present disclosure.

FIG. 8 is a diagram 800 illustrating of example PPM network 800 including the ASIC 139 and the set of dies 510, in accordance with some embodiments of the present disclosure. For example, the PPM network 800 can be similar to the PPM network 600A of FIG. 6A. The ASIC 139 is shown including a set of components. More specifically, the set of components includes a resource manager 810, a PPM budget tracker 820 and a PPM arbitrator 830.

The resource manager 810 can determine a requested amount of ASIC current consumption. For example, the amount of ASIC current consumption can be determined as a sum of individual current consumptions from multiple sources. The resource manager 810 can include a set of components, such as a BE_Operation_Handler that, a datapath scheduler (DPS) a NAND flash command (NFC), a bus component (e.g., ONFI component), and a decoder (DEC). The BE_Operation_Handler can refer to a controller task that creates a command or a request to die. For example, the BE_Operation_Handler can be a BE_Read_Handler, a BE_Program_Handler, a BE_Erase_Handler, etc. The DPS can accept the command or request from the BE_Operation_Hanlder and apply (or wait) for available current budget. The NFC can send the command or read interface status.

The PPM budget tracker 820 can track current consumption data reported by the ASIC 139 and each die of the set of dies 510. The PPM arbitrator 830 can receive, from the source manager 810, the amount of ASIC current consumption. Moreover, the PPM arbitrator 830 can receive, from the PPM budget tracker 820, the current consumption data reported by the ASIC 139 and each die of the set of dies 510. Using this information, the PPM arbitrator 820 can compare the amount of ASIC current consumption to the available current budget within the PPM network to determine whether the available current budget is sufficient. If the available current budget is sufficient (i.e., the difference between the available current budget and the amount of ASIC current consumption is greater than or equal to zero), then the ASIC 139 can reserve the amount of ASIC current consumption from the available current budget, and report the amount of ASIC current consumption to the set of dies 510 via HC#.

In some embodiments, if the available current budget is insufficient (i.e., the difference between the available current budget and the amount of ASIC current consumption is less than zero), then the ASIC 139 may be be forced to wait to reserve the amount of ASIC current consumption until there is sufficient available current budget. In some embodiments, if the available current budget is insufficient, the ASIC 139 may still broadcast the amount of ASIC current consumption via HC#. By doing so, the ASIC 139 can temporarily make it look like the total current consumption exceeds the available current budget. However, the ASIC 139 will not actually execute the task(s) until it the set of dies releases enough current (e.g., by pausing or completing tasks) such that the total current consumption is sufficiently low to enable the ASIC 139 to start the task(s).

Figure 9:
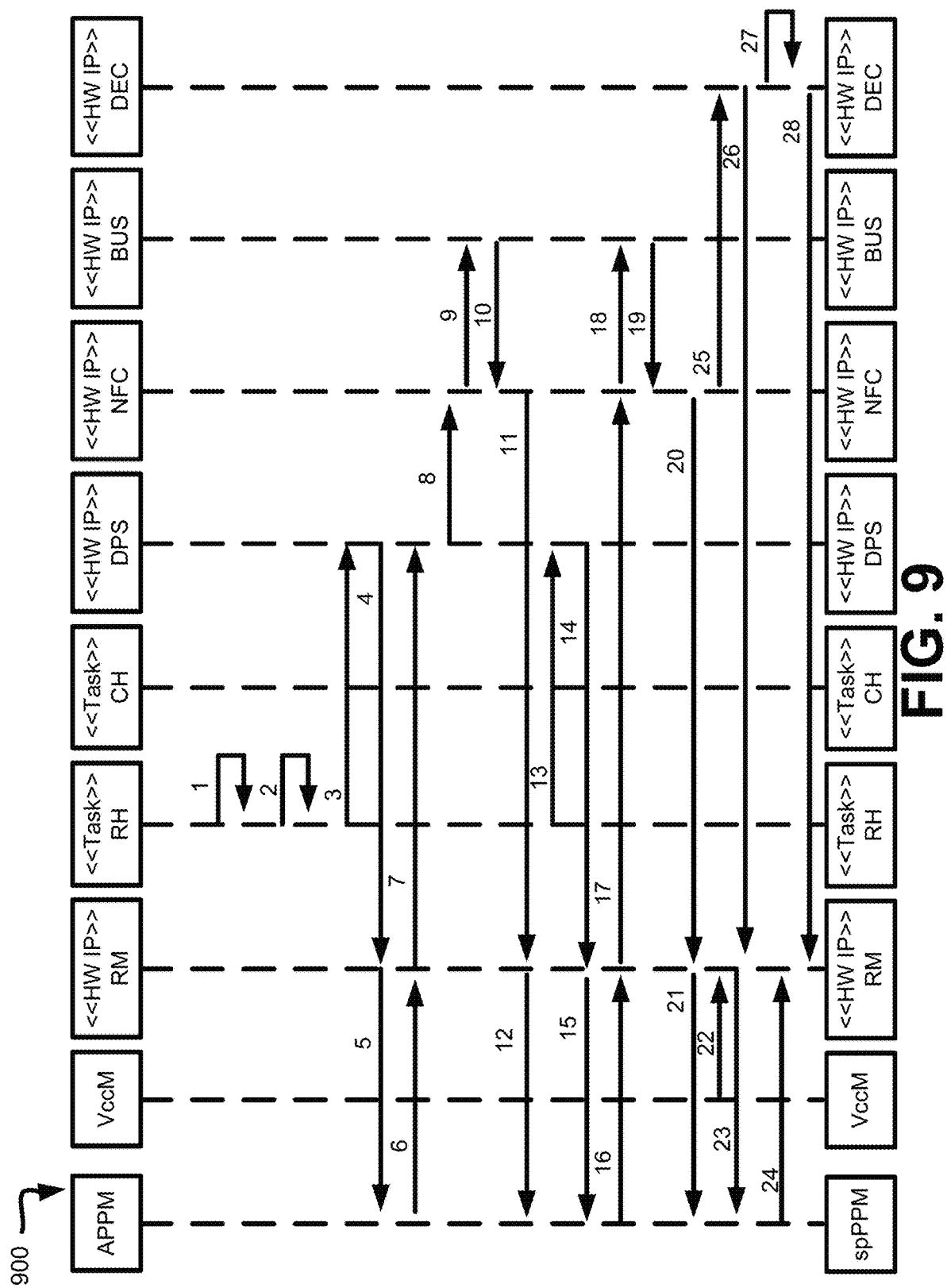
FIG. 9 is a timing diagram of an example method for implementing peak power management (PPM) extensions to application-specific integrated circuits (ASICs), in accordance with some embodiments of the present disclosure.

FIG. 9 is a timing diagram 900 of an example method for implementing PPM extensions to ASICs, in accordance with some embodiments of the present disclosure. More specifically, the timing diagram 900 illustrates an example a power profile flow related to a memory array operation. For example, the power profile flow can be a read power profile flow, a program power profile flow, an erase power profile flow, etc. As shown, the ASIC can include ASIC PPM logic (APPM) to enable the ASIC to communicate PPM data to the set of dies, a VccM component ("VCCM"), a resource manager ("RM"), a BE_Operation_Handler ("OH"), a BE_Completion_Handler ("CH"), a DPS, an NFC component ("NFC"), a bus component ("BUS"), and a DEC component ("DEC"). VCCM is a regulator of the ASIC that can consume ICC current (i.e., the ASIC can broadcast current request for it as well).

The components of the ASIC can interact to control power allocation and deallocation for memory array operations. For example, at step 1, OH fills commands. At step 2, OH creates a memory array operation request. At step 3, OH pushes the memory array operation request to DPS. DPS can identify the memory cell type (e.g., SLC, MLC, TLC, QLC) and memory array operation type (e.g., program, read, erase, mixed). At step 4, DPS causes RM to allocate power for the memory array operation request. At step 5, RM requests dynamic budget offset from APPM. At step 6, it is assumed that APPM grants the dynamic budget offset. At step 7, RM sends an acknowledgement message ("ack") to DPS to confirm the granting of the dynamic budget offset. At step 8, in response to receiving the ack, DPS sends a request to NFC. At step 9, NFC sends a memory array operation request to BUS. At step 10, BUS sends an indication back to NFC that the memory array operation is complete. At step 11, NFC causes RM to deallocate the power for the memory array operation. At step 12, RM sends an update to APPM.

The components of the ASIC can further interact to control power allocation and deallocation for data path operations. More specifically, data path operations can include ICC4 operations (e.g., data bursts). For example, at step 13, OH pushes a data path operation request to DPS. DPS can control data transfer speed (e.g., slow down or speed up data transfer speed) based on the memory cell tyle and memory array operation type (e.g., TLC write can have a slow down). At step 14, DPS causes RM to allocate power for the data path operation request. At step 15, RM requests data path operation budget from APPM. At step 16 it is assumed that APPM grants the data path operation budget. At step 17, RM sends an "ack" to DPS to confirm the granting of the data path operation budget and the DPS sends a request to the NFC. At step 18, sends a data path operation request to BUS. At step 19, BUS sends an indication back to NFC that the data path operation is complete. At step 20, NFC causes RM to deallocate the power for the data path operation. At step 21, RM sends an update to APPM.

The components of the ASIC can further interact to control power allocation and deallocation for VccM current consumption. For example, at step 22, VCCM sends a VccM request to RM. At step 23, RM forwards the VccM request to APPM. At step 24, it is assumed that APPM sends an "ack" to RM to confirm the granting of the VccM budget. Additionally, at step 25, NFC can send a request to DEC. At step 26, DEC can cause RM to allocate power. At step 27, DEC can perform a decode operation. At step 28, DEC can cause RM to deallocate power.

Figure 10A:
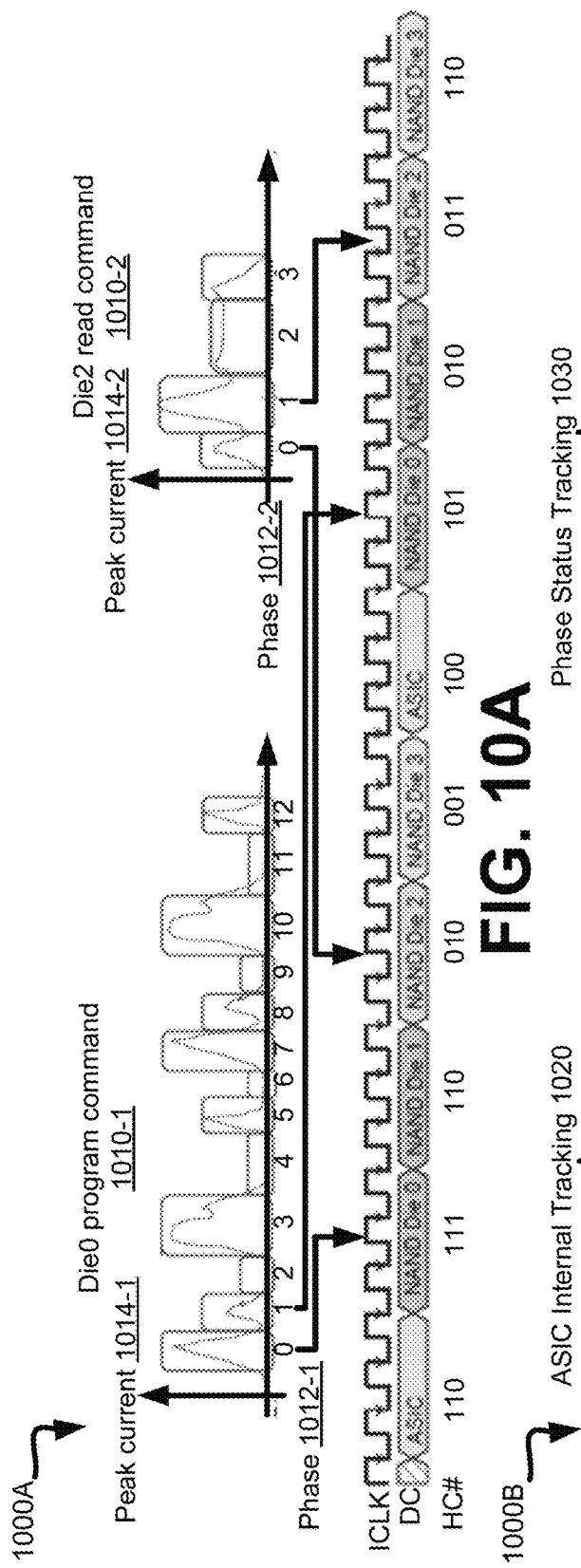
FIGS. 10A-10B are diagrams of an example system for tracking memory array operation phase status during peak power management (PPM), in accordance with some embodiments of the present disclosure.

FIG. 10A is a diagram of an example system 1000A for tracking memory array operation phase status during peak power management (PPM), in accordance with some embodiments of the present disclosure. A peak current consumption graph ("graph") 1010-1 and a graph 1010-2 are shown. Graph 1010-1 includes an x-axis 1012-1 corresponding to phase numbers of a first command and a y-axis 1014-1 corresponding to peak current consumption during execution of the first memory array operation. Graph 1010-2 includes an x-axis 1012-2 corresponding to phase numbers of a second command and a y-axis 1014-2 corresponding to peak current consumption during execution of the second command. In this illustrative example, the graph 1010-1 shows peak current consumption with respect to a program command being executed by Die0 ("Die0 program command") and the graph 1010-2 shows peak current consumption with respect to a read command being executed by Die2 ("Die2 erase command"). During a first PPM cycle, Die0 reports a three-bit current consumption value of "111" during Phase 0 of the Die1 program command, and Die2 reports a three-bit current consumption value of "010" during Phase 0 of the Die2 erase command. During a second PPM cycle, Die0 reports a three-bit current consumption value of "101" during Phase 1 of the Die1 program command, and Die2 reports a three-bit current consumption value of "011" during Phase 0 of the Die2 erase command. The other dies, e.g., Dies 1 and 3, can similarly report their three-bit current consumption values during the first and second PPM cycles.

Figure 10B:
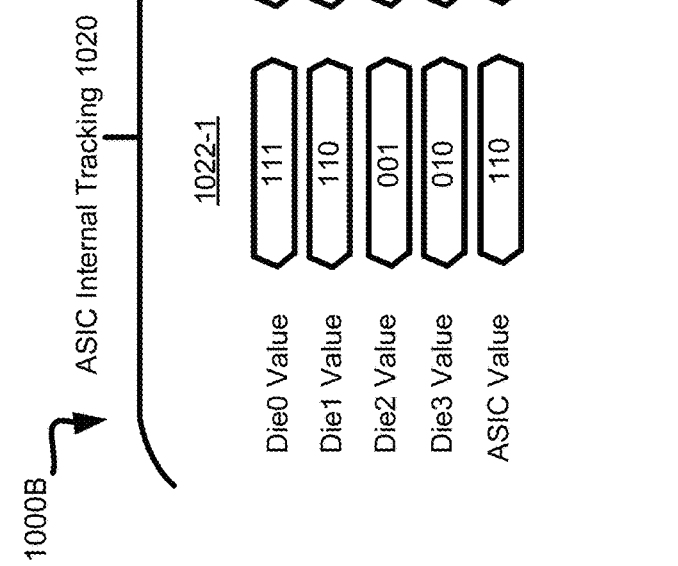

FIG. 10B is a diagram 1000B illustrating an example method to implement phase status tracking, in accordance with some embodiments of the present disclosure. For example, the method can be performed by an ASIC, such as the ASIC 139 of FIGS. 5-8. As shown, the ASIC can perform ASIC internal tracking 1020 to track sets of current consumption values including the current consumption value reported by Die0 ("Die0 Value"), the current consumption value reported by Die1 ("Die1 Value"), the current con-sumption value reported by Die2 ("Die2 Value"), and the current consumption value reported by Die3 ("Die3 Value"), and the current consumption value reported by the ASIC ("ASIC Value"). More specifically, the sets of current consumption values include a first set of current consumption values 1022-1 reported during the first PPM cycle described above with reference to FIG. 10A, and a second set of current consumption values 1022-2 reported during the second PPM cycle described above with reference to FIG. 10A.

The ASIC can then proceed to initiate phase status tracking 1030. More specifically, for each of Die0 through Die3, it is determined at step 1032 whether there is a die value change from the first PPM cycle to the second PPM cycle. If there is a die value change for a die, then the phase number for the die is incremented at step 1034. For example, the ASIC can cause the phase number assigned to the die to be incremented. Otherwise, if there is no die value change for a die, then there is no phase number change at step 1036. In this illustrative example, there is a die value change of each of the die values. More specifically, Die0 Value changes from 111 to 101, Die1 Value changes from 110 to 010, Die2 Value changes from 001 to 011, and Die3 Value changes from 010 to 110. The ASIC can then update a set of phase numbers 1037. The set of phase numbers 1037 can include the phase number of Die0 ("Die0 Phase"), the phase number of Die1 ("Die1 Phase), the phase number of Die2 ("Die2 Phase), and the phase number of Die3 ("Die3 Phase). In this illustrative example, the Die0 Phase is updated to Phase 1, the Die1 Phase is updated to Phase 3, the Die2 Phase is updated to Phase 1, and the Die3 Phase is updated to Phase 12. For example, the Die0 Phase can be phase 1 of a program operation, the Die1 Phase can be phase 3 of an erase command, the Die2 Phase can be phase 1 of a read command, and the Die3 Phase can be phase 12 of a program command. The ASIC can then provide the set of phase statuses 1037 to a priority control arbitration component 1038. The set of phases statuses 1037 can use the set of phase statuses 1037 to improve priority control arbitration. For example, the priority control arbitration component 1038 can implement a smart priority control scheduler for scheduling memory array operations in accordance with priority.

Priority control can be performed by implementing a base current budget and a supplemental current budget. For example, the base budget can be a default current budget that is used to handle operations. To prevent situations in which a high priority task would cause an overbudget scenario with respect to the base current budget, the priority control arbitration component 1038 can enable access to supplemental current budget. The priority control arbitration component 1038 can remove access to the supplemental current budget, and thus revert back to the base current budget.

Figure 11:
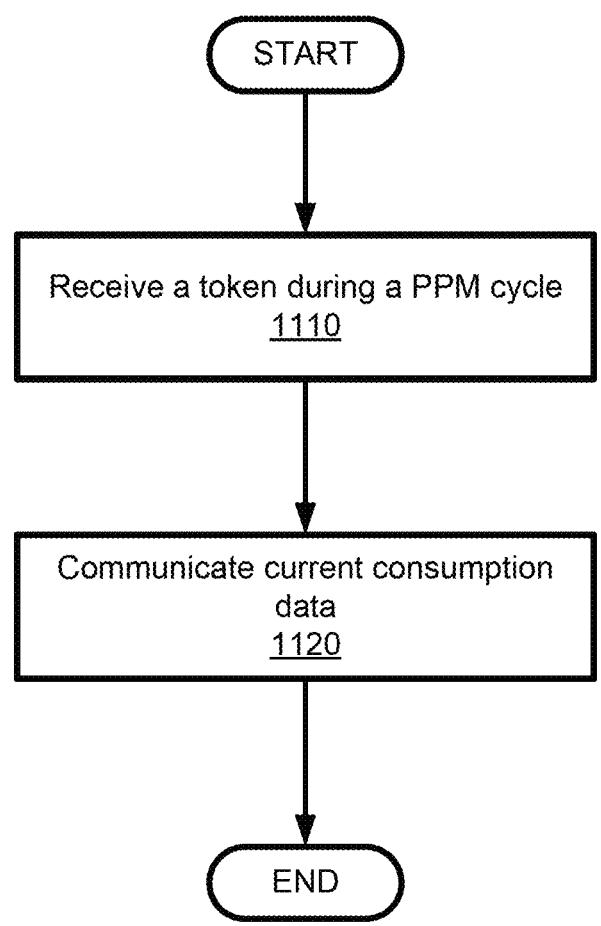
FIGS. 11-13 are flow diagrams of example methods for implementing peak power management (PPM) extensions to application-specific integrated circuits (ASICs), in accordance with some embodiments of the present disclosure.

FIG. 11 is a flow diagram of an example method 1100 to implement PPM extensions to ASICs, in accordance with some embodiments of the present disclosure. The method 1100 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the local media controller 135 and/or the PPM component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1110, a token is received. For example, control logic can receive a token during a PPM cycle. More specifically, the token can be received from a die of a set of dies of a PPM network of a memory device. The set of dies can include a plurality of dies forming a token ring group. The token ring group is an ordered group of dies. The token ring group can include a primary die and a number of secondary die. For example, the first die of the token ring group can be assigned to be the primary die. The primary die can be responsible for controlling the passing of a PPM token using a clock signal (ICLK). For example, the PPM network can include a plurality of channels, and each channel of the plurality of channels can include a respective set of dies. Illustratively, each channel of the plurality of channels can include a pair of dies (e.g., Die0 and Die1).

At operation 1120, current consumption data is communicated. For example, control logic can cause the current consumption data to be communicated to each die of the set of dies. More specifically, control logic can cause the current consumption data to be communicated to each die of the set of dies during a PPM cycle via their respective PPM components. The current consumption data can be related to the amount of current consumed during execution of one or more operations from one or more sources. For example, the one or more sources can include at least one of: a data path operation source, a VccM source, or a memory array operation source. Further details regarding operations 1110-1120 are described above with reference to FIGS. 1A-10B.

Figure 12:
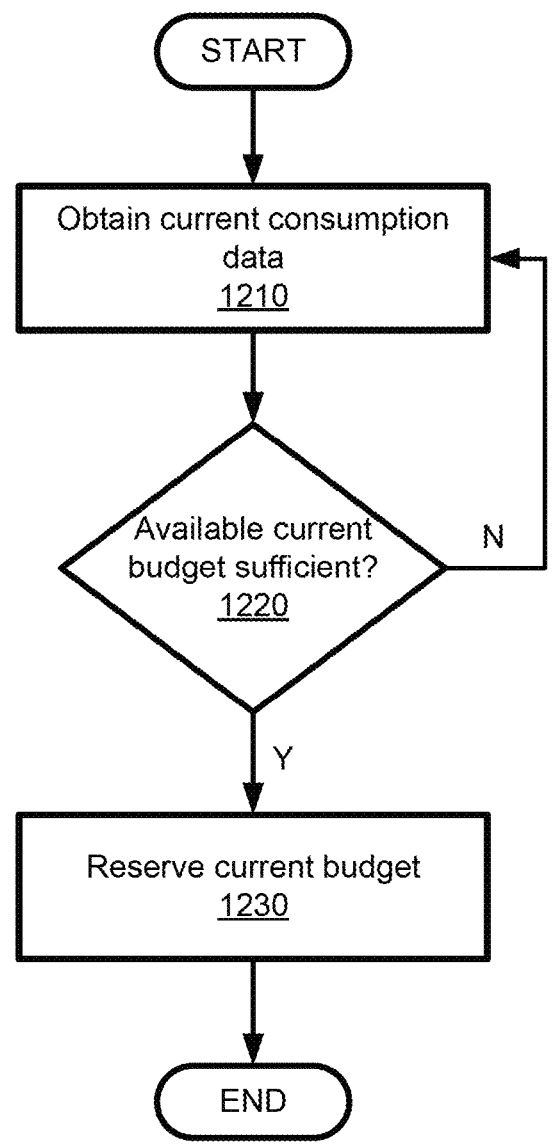

FIG. 12 is a flow diagram of an example method 1200 to implement PPM extensions to ASICs, in accordance with some embodiments of the present disclosure. The method 1200 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by the local media controller 135 and/or the PPM component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1210, current consumption data is obtained. For example, control logic can receive the current consumption data from one or more sources. More specifically, the current consumption data can include ASIC current consumption data and the available current budget within a PPM network. The ASIC current consumption data can reflect a total amount of current budget being requested by the one or more source. For example, the ASIC current consumption data can reflect a predicted amount of current budget. The one or more sources can include, for example, a data path operation (e.g., data burst) source, a VccM source, and a memory array operation source. The memory array operation source can be an adaptive budget control source. The adaptive budget control source can implement workload budget tuning among memory array operation workloads, such as mixed loads, sequential write loads, etc.

At operation 1220, a determination is made. For example, control logic can determine whether the available current budget is sufficient with respect to the ASIC current consumption data. If not, the process can revert back to operation 1210 to obtain current consumption data and/or wait for the available current budget to be sufficient with respect to the ASIC current consumption data.

If the available current budget is sufficient, then current budget is reserved at operation 1230. For example, control logic can cause the current budget to be reserved from the available current budget. More specifically, the current budget reserved at operation 1230 is equal to the total amount of current budget that was requested by the one or more components of the ASIC. Further details regarding operations 1210-1230 are described above with reference to FIGS. 8-9.

Figure 13:
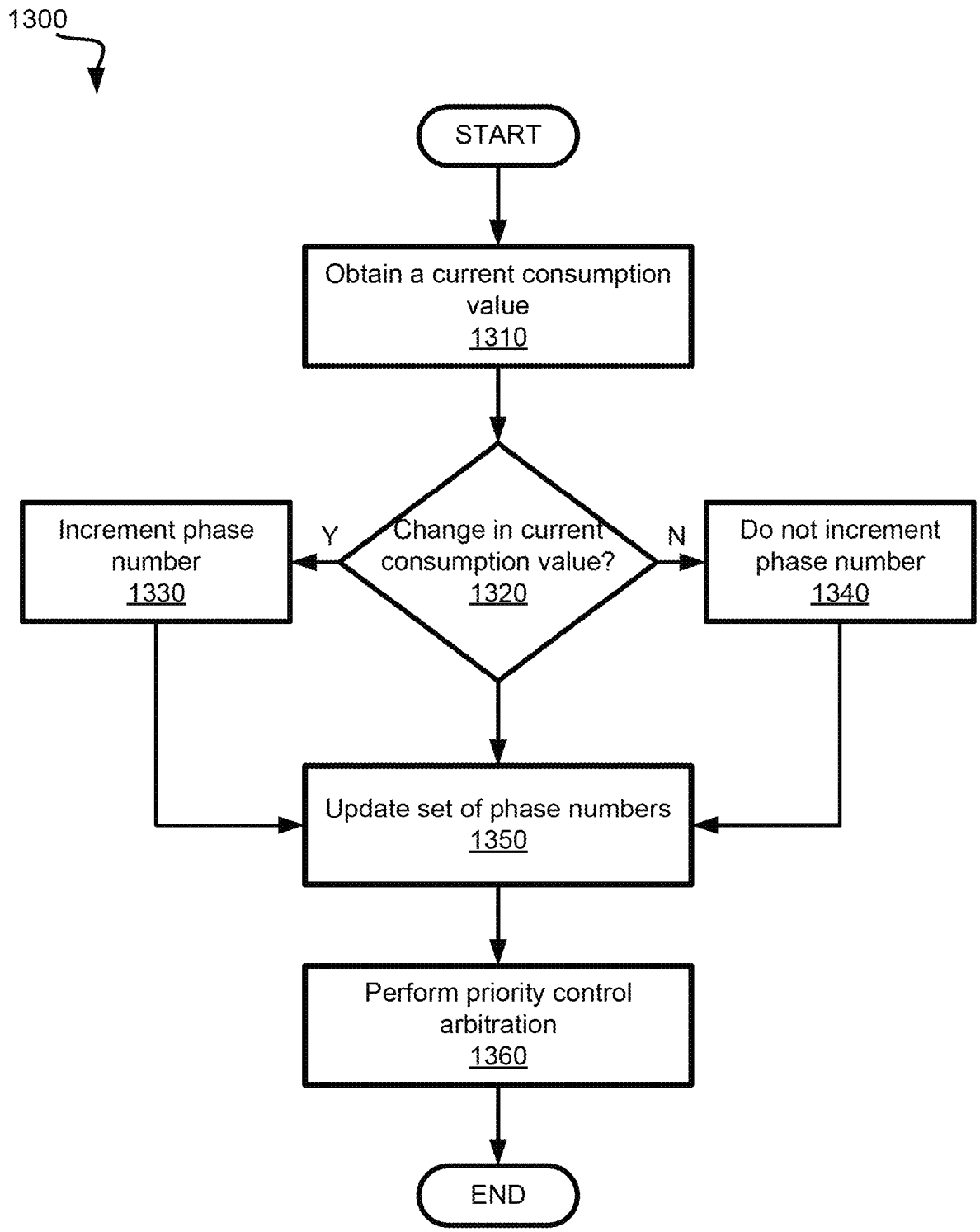

FIG. 13 is a flow diagram of an example method 1300 to implement PPM extensions to ASICs, in accordance with some embodiments of the present disclosure. The method 1300 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by the ASIC 139 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1310, a current consumption value is obtained. For example, control logic can receive the current consumption value from a die of a set of dies during a PPM cycle.

At operation 1320, a determination is made. For example, control logic can determine whether there is a change in the current consumption value. More specifically, determining whether there is change in the current consumption value can include comparing the current consumption value to the previous current consumption value for the die (i.e., the current consumption value that was reported by the die during the previous PPM cycle).

If there is a change in current consumption value, then a phase number is incremented at operation 1330. For example, control logic can cause the phase number for the die to be incremented. The phase number can reflect the phase of an operation being handled by the die. For example, the phase number can reflect a phase of a read operation, an erase operation, a program operation, etc.

Otherwise, at operation 1340, the phase number is not incremented. For example, control logic can maintain the phase number for the die at the value it was at after the previous PPM cycle. At operation 1350, a set of phase numbers is updated. For example, control logic can cause the phase number for the die to be updated within the set of phase numbers. Each phase number of the set of phase numbers corresponds to a phase of a command being executed by a respective die of the set of dies.

At operation 1360, priority control arbitration is performed. For example, control logic can cause priority control arbitration to be performed using the set of phase numbers. Priority control arbitration can be performed to help control scheduling of operations to be performed by respective dies of the set of dies. Further details regarding operations 1310-1360 are described above with reference to FIGS. 10A-10B.

Figure 14:
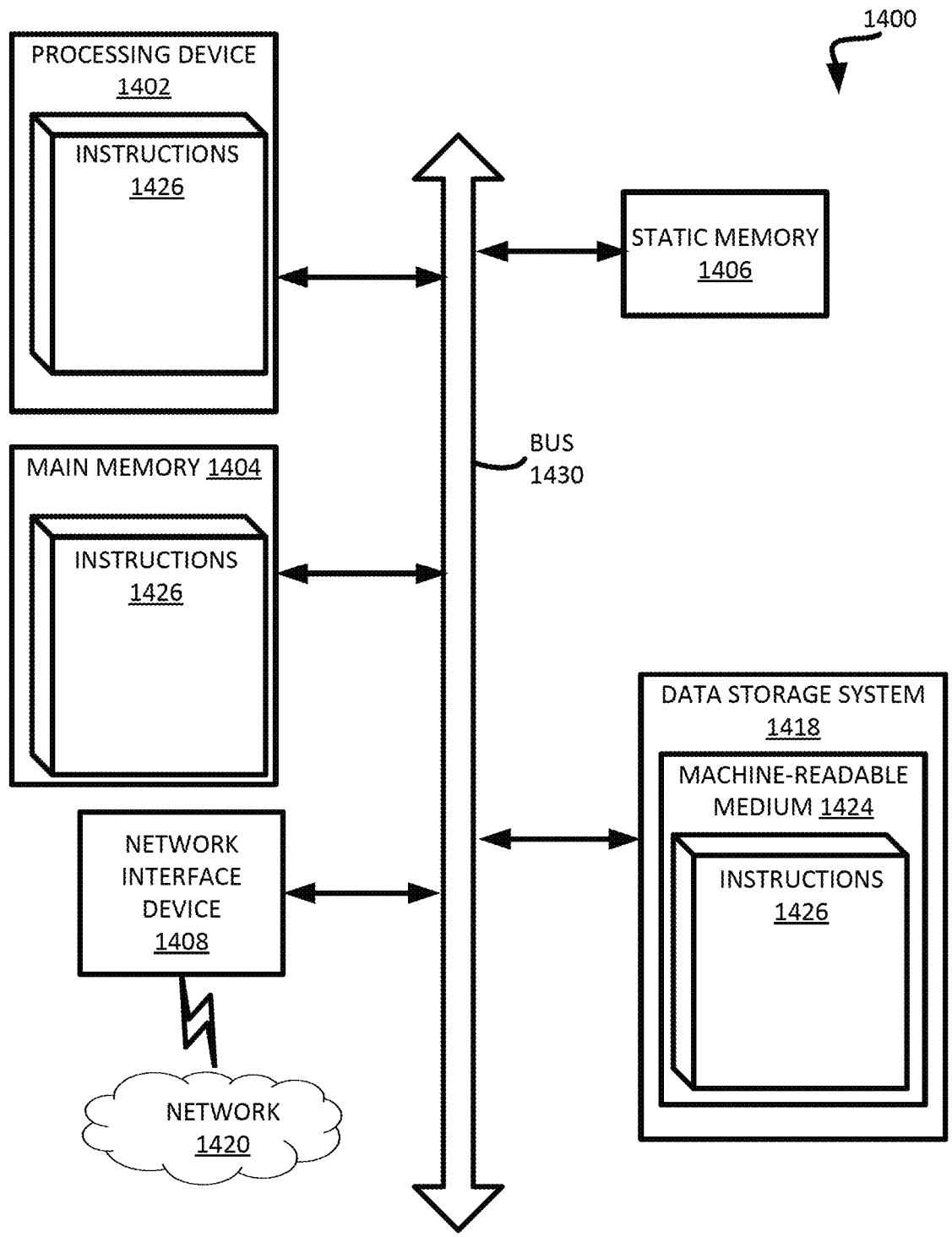
FIG. 14 is a block diagram of an example computer system in which embodiments of the present disclosure may operate.

FIG. 14 illustrates an example machine of a computer system 1400 within which a set of instructions, for causing the machine to perform any one or more of the methodologies discussed herein, can be executed. In some embodiments, the computer system 1400 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 and/or the PPM component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or RDRAM, etc.), a static memory 1406 (e.g., flash memory, static random access memory (SRAM), etc.), and a data storage system 1418, which communicate with each other via a bus 1430.

Processing device 1402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 can also be one or more special-purpose processing devices such as an application specific integrated circuit (ASIC), a field programmable gate array (FPGA), a digital signal processor (DSP), network processor, or the like. The processing device 1402 is configured to execute instructions 1426 for performing the operations and steps discussed herein. The computer system 1400 can further include a network interface device 1408 to communicate over the network 1420.

The data storage system 1418 can include a machine-readable storage medium 1424 (also known as a computer-readable medium) on which is stored one or more sets of instructions 1426 or software embodying any one or more of the methodologies or functions described herein. The instructions 1426 can also reside, completely or at least partially, within the main memory 1404 and/or within the processing device 1402 during execution thereof by the computer system 1400, the main memory 1404 and the processing device 1402 also constituting machine-readable storage media. The machine-readable storage medium 1424, data storage system 1418, and/or main memory 1404 can correspond to the memory sub-system 110 of FIG. 1A.

In one embodiment, the instructions 1426 include instructions to implement functionality corresponding to a local media controller, an ASIC and/or a PPM component (e.g., the local media controller 135, the PPM component 137 and/or the ASIC 139 of FIG. 1A). While the machine-readable storage medium 1424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a set of memory dies, each memory die of the set of memory dies comprising a memory array and first control logic operatively coupled to the memory array; and
   an application-specific integrated circuit (ASIC) for implementing peak power management (PPM), the ASIC comprising:
      a general-purpose input/output component (GPIO) communicably coupled to each memory die of the set of memory dies for implementing PPM, wherein the GPIO comprises:
         a first digital pad operatively coupled to a first line associated with a clock signal and a second digital pad operatively coupled to a second line associated with current consumption data communication to the set of memory dies; or
         a single digital pad operatively coupled to a single line to enable communication of a calibration signal to the set of memory dies; and
      second control logic to perform PPM operations using the GPIO.

2. The system of claim 1, wherein the PPM operations further comprise:
   receiving a token during a PPM cycle; and
   in response to receiving the token, communicating, via the second line during the PPM cycle, current consumption data to each memory die of the set of memory dies.

3. The system of claim 1, wherein the calibration signal comprises single bit data.

4. The system of claim 1, wherein the PPM operations comprise:
   obtaining current consumption data;
   determining whether an available current budget is sufficient with respect to the current consumption data; and
   in response to determining that the available current budget is sufficient with respect to the current consumption data, causing current budget to be reserved from the available current budget.

5. The system of claim 1, wherein the PPM operations comprise:
   obtaining, from each memory die of the set of memory dies, a current consumption value associated with an amount of current consumed by executing a command during a PPM cycle, wherein the command comprises a plurality of phases, wherein the memory die is assigned a previous phase number representing a phase of the plurality of phases of the command, and wherein the previous phase number is determined from a previous current consumption value reported by the memory die during a previous PPM cycle;
   determining, for each memory die of the set of memory dies, whether there is a change in the current consumption value of the memory die with respect to the previous current consumption value of the memory die;
   for each memory die, in response to determining that there is a change in the current consumption value of the memory die with respect to the previous current consumption value of the memory die, incrementing the previous phase number of the memory die to obtain an updated phase number; and
   causing a set of phase numbers to be updated based on each updated phase number.

6. A method comprising:
   receiving, by a processing device, current consumption data from one or more sources corresponding to an application-specific integrated circuit (ASIC), operatively coupled to each die of a set of dies of a memory device, for implementing peak power management (PPM);
   determining, by the processing device, whether an available current budget is sufficient with respect to the current consumption data;
   in response to determining that the available current budget is sufficient with respect to the current consumption data, causing current budget to be reserved from the available current budget; and
   communicating, by the processing device using a general-purpose input/output component (GPIO) of the ASIC for implementing PPM, data to each die of the set of dies, wherein the GPIO comprises:
      a first digital pad operatively coupled to a first line associated with a clock signal and a second digital pad operatively coupled to a second line associated with current consumption data communication to the set of dies; or
      a single digital pad operatively coupled to a single line to enable communication of a calibration signal to the set of dies.

7. The method of claim 6, wherein the one or more sources comprise at least one of: a data path operation source, a VccM source, or a memory array operation source.

8. The method of claim 6, wherein the current consumption data reflects a total amount of current budget being requested by the one or more sources.

9. The method of claim 6, wherein the current consumption data reflects a predicted amount of current budget to be consumed by the one or more sources.

10. The method of claim 6, wherein communicating the data to each die of the set of dies comprises:
    receiving a token during a PPM cycle; and
    in response to receiving the token, communicating, via the second line during the PPM cycle, current consumption data to each die of the set of dies.

11. The method of claim 6, further comprising:
obtaining, by the processing device from each die of the set of dies, a current consumption value associated with an amount of current consumed by executing a command during a PPM cycle, wherein the command comprises a plurality of phases, wherein the die is assigned a previous phase number representing a phase of the plurality of phases of the command, and wherein the previous phase number is determined from a previous current consumption value reported by the die during a previous PPM cycle;
determining, by the processing device for each die of the set of dies, whether there is a change in the current consumption value of the die with respect to the previous current consumption value of the die;
in response to determining that there is a change in the current consumption value of the die with respect to the previous current consumption value of the die, incrementing, by the processing device for each die, the previous phase number of the die to obtain an updated phase number; and
causing, by the processing device, a set of phase numbers to be updated based on each updated phase number.

12. A system comprising:
a general-purpose input/output component (GPIO) communicably coupled to each memory die of a set of memory dies for implementing peak power management (PPM), wherein the GPIO comprises:
a first digital pad operatively coupled to a first line associated with a clock signal and a second digital pad operatively coupled to a second line associated with current consumption data communication to the set of memory dies; or
a single digital pad operatively coupled to a single line to enable communication of a calibration signal to the set of memory dies; and
control logic, operatively coupled to memory, to perform PPM operations using the GPIO, the PPM operations comprising:
obtaining current consumption data;
determining whether an available current budget is sufficient with respect to the current consumption data; and
in response to determining that the available current budget is sufficient with respect to the current consumption data, causing current budget to be reserved from the available current budget.

13. The system of claim 12, wherein the PPM operations further comprise:
determining total current consumption during a PPM cycle; and
reporting the total current consumption during the PPM cycle via the second line.

14. The system of claim 12, wherein the calibration signal comprises single bit data.

15. The system of claim 12, wherein the PPM operations further comprise:
obtaining, from each memory die of the set of memory dies, a current consumption value associated with an amount of current consumed by executing a command during a PPM cycle, wherein the command comprises a plurality of phases, wherein the memory die is assigned a previous phase number representing a phase of the plurality of phases of the command, and wherein the previous phase number is determined from a previous current consumption value reported by the memory die during a previous PPM cycle;
determining, for each memory die of the set of memory dies, whether there is a change in the current consumption value of the memory die with respect to the previous current consumption value of the memory die;
for each memory die, in response to determining that there is a change in the current consumption value of the memory die with respect to the previous current consumption value of the memory die, incrementing the previous phase number of the memory die to obtain an updated phase number; and
causing a set of phase numbers to be updated based on each updated phase number.

\* \* \* \* \*